United States Patent
Gao et al.

(10) Patent No.: US 9,749,143 B2
(45) Date of Patent: Aug. 29, 2017

(54) WEB REAL-TIME COMMUNICATION CALL TRANSFERRING METHOD AND APPARATUS

(71) Applicant: Huawei Device Co., Ltd., Shenzhen (CN)

(72) Inventors: Wenmei Gao, Beijing (CN); Shunan Fan, Beijing (CN); Xiaoqiang Lv, Beijing (CN); Yahui Wang, Beijing (CN); Hao Jing, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 397 days.

(21) Appl. No.: 14/330,729

(22) Filed: Jul. 14, 2014

(65) Prior Publication Data

US 2014/0324979 A1 Oct. 30, 2014

Related U.S. Application Data

(63) Continuation of application No. PCT/CN2012/084622, filed on Nov. 15, 2012.

(51) Int. Cl.
*G06F 15/16* (2006.01)
*H04L 12/18* (2006.01)
(Continued)

(52) U.S. Cl.
CPC .......... *H04L 12/1818* (2013.01); *G06F 17/00* (2013.01); *H04L 65/1046* (2013.01);
(Continued)

(58) Field of Classification Search
CPC ............. H04L 12/1818; H04L 65/1046; H04L 65/1096; H04L 67/02; H04L 67/10; G06F 17/00; H04W 4/003
(Continued)

(56) References Cited

U.S. PATENT DOCUMENTS

2005/0033843 A1* 2/2005 Shahi ................ G06F 17/30899
709/226
2008/0002689 A1 1/2008 Vera
(Continued)

FOREIGN PATENT DOCUMENTS

| CN | 101120556 A | 2/2008 |
| CN | 102572365 A | 7/2012 |

(Continued)

OTHER PUBLICATIONS

Kaplan, H., et al., "Requirements for Interworking WebRTC," draft-kaplan-rtcweb-sip-interworking-requirements-02.txt, Nov. 22, 2011, 24 pages.
(Continued)

*Primary Examiner* — Wing F Chan
*Assistant Examiner* — Joseph Maniwang
(74) *Attorney, Agent, or Firm* — Conley Rose, P.C.

(57) ABSTRACT

A web real-time communication WebRTC call transferring method and apparatus. The method includes receiving a first identifier used for identifying a to-be-transferred call, where the to-be-transferred call is a WebRTC call having been established between a source terminal and a remote terminal, sending, according to the first identifier, a first request message used for requesting page information corresponding to the to-be-transferred call to a WebRTC server, and establishing, according to identification information of the remote terminal in the page information sent by the WebRTC server, a call connection used for bearing the to-be-transferred call with the remote terminal. By means of the embodiments of the present invention, the WebRTC call between the source terminal and the remote terminal may be transferred to between the destination terminal and the remote terminal, thereby implementing transferring of a WebRTC call between terminals.

18 Claims, 13 Drawing Sheets

(51) Int. Cl.
  *G06F 17/00* (2006.01)
  *H04L 29/06* (2006.01)
  *H04L 29/08* (2006.01)
  *H04W 4/00* (2009.01)

(52) U.S. Cl.
  CPC .......... *H04L 65/1096* (2013.01); *H04L 67/02* (2013.01); *H04L 67/10* (2013.01); *H04W 4/003* (2013.01)

(58) Field of Classification Search
  USPC .................................................. 709/204, 227
  See application file for complete search history.

(56) References Cited

U.S. PATENT DOCUMENTS

| | | | |
|---|---|---|---|
| 2008/0298560 A1 | 12/2008 | Purdy et al. | |
| 2009/0016520 A1* | 1/2009 | Saiki | H04L 65/1089 379/220.01 |
| 2009/0323675 A1 | 12/2009 | Raza | |
| 2010/0157882 A1 | 6/2010 | Moriwaki et al. | |
| 2011/0002329 A1* | 1/2011 | Jin | H04M 3/58 370/352 |
| 2011/0064047 A1 | 3/2011 | Nieminen | |
| 2011/0164106 A1 | 7/2011 | Kim | |
| 2013/0318249 A1* | 11/2013 | McDonough | H04L 67/02 709/228 |
| 2014/0126714 A1* | 5/2014 | Sayko | H04M 3/5191 379/265.09 |

FOREIGN PATENT DOCUMENTS

| | | |
|---|---|---|
| CN | 102696224 A | 9/2012 |
| KR | 20050079131 A | 8/2005 |
| WO | 2008095987 A2 | 8/2008 |

OTHER PUBLICATIONS

Foreign Communication From a Counterpart Application, European Application No. 12888390.7, Extended European Search Report dated Jan. 27, 2015, 12 pages.

Foreign Communication From a Counterpart Application, Chinese Application No. 201280005197.7, Chinese Office Action dated Apr. 13, 2016, 5 pages.

Foreign Communication From a Counterpart Application, Chinese Application No. 201280005197.7, Chinese Search Report dated Apr. 1, 2016, 2 pages.

Foreign Communication From a Counterpart Application, PCT Application No. PCT/CN2012/084622, English Translation of International Search Report dated Aug. 22, 2013, 2 pages.

* cited by examiner

WEB REAL-TIME COMMUNICATION CALL TRANSFERRING METHOD AND APPARATUS

CROSS-REFERENCE TO RELATED APPLICATIONS

This application is a continuation of International Application No. PCT/CN2012/084622, filed on Nov. 15, 2012, which is hereby incorporated by reference in its entirety.

TECHNICAL FIELD

The present invention relates to the field of electronic communications, and in particular, to a web real-time communication (WebRTC) call transferring method and apparatus.

BACKGROUND

WebRTC is a technology for performing real-time video and audio communication in a browser, which can implement an audio/video call function between browsers or between a browser and a conventional communications terminal. For example, a video conference can be performed by using two different browsers supporting the WebRTC function. WebRTC technical specifications are specified by the Internet Engineering Task Force (IETF) and the World Wide Web consortium (W3C) together. However, an existing WebRTC technology does not support a WebRTC call transferring function, that is, a user cannot transfer a WebRTC call being performed on one terminal (for example, a personal computer or a mobile phone) to another terminal (for example, a mobile phone or a personal computer) in a seamless manner (that is, the call does not drop).

Some browsers may implement seamless transferring of content, such as a web page, a picture, a novel, a video, a text, and a telephone number, between two terminals of a same user. For example, a "cloud fly" function of the Sky Browser can implement instant "fly" of content, such as a web page, a picture, a novel, a video, a text, and a telephone number, between a personal computer (PC) and a mobile phone. By taking transferring a web page as an example, specifically, a same Sky cloud account is logged in at the PC end and the mobile phone end simultaneously, web page information requiring transferring is first sent to the cloud account, and is then pushed to the other terminal, and the other terminal, after receiving the web page information sent by the cloud account, automatically opens the web page, thereby implementing the seamless transferring.

The seamless transferring function of an existing browser cannot support transferring of a WebRTC call being performed between two terminals of the same user, and therefore, the transferring of a WebRTC call between terminals cannot be implemented currently.

SUMMARY

Embodiments of the present invention provide a web real-time communication WebRTC call transferring method on one hand, and provide a web real-time communication WebRTC call transferring apparatus on the other hand, thereby implementing transferring of a WebRTC call between terminals.

According to a first aspect, a WebRTC call transferring method includes receiving a first identifier used for identifying a to-be-transferred call, where the to-be-transferred call is a WebRTC call having been established between a source terminal and a remote terminal, sending, according to the first identifier, a first request message used for requesting page information corresponding to the to-be-transferred call to a WebRTC server, and establishing, according to identification information of the remote terminal in the page information sent by the WebRTC server, a call connection used for bearing the to-be-transferred call with the remote terminal, so as to implement transferring of the to-be-transferred call from between the source terminal and the remote terminal to between a destination terminal and the remote terminal.

In a first possible implementation manner of the first aspect, before the establishing, according to identification information of the remote terminal in the page information sent by the WebRTC server, a call connection used for bearing the to-be-transferred call with the remote terminal, the method further includes receiving a first token sent by a browser server, where the first token is a token allocated by the browser server for the destination terminal and used for identifying the destination terminal, sending authentication information of the first token to the WebRTC server, so that the WebRTC server performs authentication on the authentication information of the first token, and receiving the page information corresponding to the to-be-transferred call and sent by the WebRTC server after the authentication performed on the authentication information of the first token passes.

With reference to the first aspect or the first possible implementation manner of the first aspect, in a second possible implementation manner, the establishing, according to identification information of the remote terminal in the page information sent by the WebRTC server, a call connection used for bearing the to-be-transferred call with the remote terminal includes sending, according to the identification information of the remote terminal in the page information sent by the WebRTC server, a call request message to the remote terminal by using the WebRTC server, and receiving, by using the WebRTC server, a response message returned by the remote terminal according to the call request message, and establishing the call connection used for bearing the to-be-transferred call with the remote terminal.

With reference to the first aspect, or the first possible implementation manner of the first aspect, or the second possible implementation manner of the first aspect, in a third possible implementation manner, the receiving a first identifier used for identifying a to-be-transferred call specifically includes receiving the first identifier used for identifying the to-be-transferred call sent by the browser server after receiving an indication sent by the source terminal and used for initiating transferring of the to-be-transferred call, where a browser account logged into on the source terminal may be the same as that logged into on the destination terminal, so that the source terminal learns, by using the browser server, that the destination terminal is an optional terminal to be transferred to, where the indication sent by the source terminal and used for initiating transferring of the to-be-transferred call includes indication information indicating that the destination terminal is a terminal to be transferred to.

According to a second aspect, a WebRTC call transferring method includes receiving a first request message used for requesting page information corresponding to a to-be-transferred call and sent by a destination terminal according to a first identifier, where the first identifier is used for identifying the to-be-transferred call, and the to-be-transferred call is a WebRTC call having been established between a source terminal and a remote terminal, and sending the page information corresponding to the to-be-transferred call to the destination terminal, so that the destination terminal establishes, according to identification information of the remote terminal in the page information, a call connection used for bearing the to-be-transferred call with the remote terminal, so as to implement transferring of the to-be-transferred call from between the source terminal and the remote terminal to between the destination terminal and the remote terminal.

In a first possible implementation manner of the second aspect, the method further includes before the sending the page information corresponding to the to-be-transferred call to the destination terminal, receiving authentication information of a first token sent by the destination terminal, where the first token is a token allocated by a browser server for the destination terminal and used for identifying the destination terminal, and performing, according to a second token sent by the source terminal, authentication on the authentication information of the first token sent by the destination terminal, where the second token is acquired by the source terminal from the browser server, and is a token allocated by the browser server for the destination terminal and used for identifying the destination terminal, and the sending the page information corresponding to the to-be-transferred call to the destination terminal specifically includes, if it is determined through the authentication performed on the authentication information of the first token that the first token is the same as the second token, sending the page information corresponding to the to-be-transferred call to the destination terminal.

With reference to the second aspect, or the first possible implementation manner of the second aspect, in a second possible implementation manner, before the receiving a first request message used for requesting page information corresponding to a to-be-transferred call and sent by a destination terminal according to a first identifier, the method further includes receiving a generation request for generating the first identifier, which is sent by the source terminal, and sending the first identifier generated according to the generation request to the source terminal, so that the source terminal sends the first identifier to the browser server, and the browser server sends the first identifier to the destination terminal.

With reference to the second aspect, or the first possible implementation manner of the second aspect, or the second possible implementation manner of the second aspect, in a third possible implementation manner, after the sending the page information corresponding to the to-be-transferred call to the destination terminal, the method further includes receiving a call request message used for calling the remote terminal and sent by the destination terminal, sending the call request message to the remote terminal, receiving a response message returned by the remote terminal according to the call request, and sending the response message to the destination terminal, so that the destination terminal establishes the call connection with the remote terminal.

With reference to the third possible implementation manner of the second aspect, in a fourth possible implementation manner, the method further includes after the remote terminal establishes the call connection with the destination terminal, releasing, by a WebRTC server or the remote terminal, a call connection between the remote terminal and the source terminal.

With reference to the second aspect, or the first possible implementation manner of the second aspect, or the second possible implementation manner of the second aspect, in a fifth possible implementation manner, after the sending the page information corresponding to the to-be-transferred call to the destination terminal, the method further includes receiving a call request message used for calling the remote terminal and sent by the destination terminal, where the call request message includes a first session identifier corresponding to the destination terminal, changing the first session identifier in the call request message into a second session identifier corresponding to the source terminal, sending the changed call request message to the remote terminal, receiving a response message returned by the remote terminal according to the changed call request message, where the response message includes the second session identifier, changing the second session identifier in the response message into the first session identifier, sending the changed response message to the destination terminal, so that the destination terminal establishes the call connection with the remote terminal, and after the destination terminal establishes the call connection with the remote terminal, sending the source terminal a release indication message used for instructing the source terminal to release the to-be-transferred call.

According to a third aspect, a WebRTC call transferring apparatus includes an identifier receiving module configured to receive a first identifier used for identifying a to-be-transferred call, where the to-be-transferred call is a WebRTC call having been established between a source terminal and a remote terminal, a page requesting module configured to send, according to the first identifier received by the identifier receiving module, a first request message used for requesting page information corresponding to the to-be-transferred call to a WebRTC server, and a call connecting module configured to establish, according to identification information of the remote terminal in the page information sent by the WebRTC server, a call connection used for bearing the to-be-transferred call with the remote terminal, so as to implement transferring of the to-be-transferred call from between the source terminal and the remote terminal to between a destination terminal and the remote terminal, where the page information is sent by the WebRTC server according to the first request message sent by the page requesting module.

In a first possible implementation manner of the third aspect, the apparatus further includes a first token receiving module configured to, before the call connecting module establishes, according to the identification information of the remote terminal in the page information sent by the WebRTC server, the call connection used for bearing the to-be-transferred call with the remote terminal, receive a first token sent by a browser server, where the first token is a token allocated by the browser server for the destination terminal and used for identifying the destination terminal, an authentication sending module configured to, before the call connecting module establishes, according to the identification information of the remote terminal in the page information sent by the WebRTC server, the call connection used for bearing the to-be-transferred call with the remote terminal, send authentication information of the first token received by the first token receiving module to the WebRTC server, so that the WebRTC server performs authentication on the authentication information of the first token, and a page receiving module configured to, before the call connecting module establishes, according to the identification information of the remote terminal in the page information sent by the WebRTC server, the call connection used for bearing the to-be-transferred call with the remote terminal, receive the page information corresponding to the to-betransferred call and sent by the WebRTC server after the authentication performed on the authentication information of the first token passes.

With reference to the third aspect or the first possible implementation manner of the third aspect, in a second possible implementation manner, the call connecting module includes a call requesting unit configured to send a call request message to the remote terminal by using the WebRTC server according to the identification information of the remote terminal in the page information sent by the WebRTC server, where the page information is sent by the WebRTC server according to the first request message sent by the page requesting module, and a connection establishing unit configured to receive, by using the WebRTC server, a response message returned by the remote terminal according to the call request message, and establish the call connection used for bearing the to-be-transferred call with the remote terminal.

With reference to the third aspect, or the first possible implementation manner of the third aspect, or the second possible implementation manner of the third aspect, in a third possible implementation manner, the identifier receiving module is specifically configured to receive the first identifier used for identifying the to-be-transferred call sent by the browser server after receiving an indication sent by the source terminal and used for initiating transferring of the to-be-transferred call, where a browser account logged into on the source terminal may be the same as that logged into on the destination terminal, so that the source terminal learns, by using the browser server, that the destination terminal is an optional terminal to be transferred to, where the indication sent by the source terminal and used for initiating transferring of the to-be-transferred call includes indication information indicating that the destination terminal is a terminal to be transferred to.

According to a fourth aspect, a WebRTC call transferring apparatus includes a page request receiving module configured to receive a first request message used for requesting page information corresponding to a to-be-transferred call and sent by a destination terminal according to a first identifier, where the first identifier is used for identifying the to-be-transferred call, and the to-be-transferred call is a WebRTC call having been established between a source terminal and a remote terminal, and a page sending module configured to send, according to the first request message received by the page request receiving module, the page information corresponding to the to-be-transferred call to the destination terminal, so that the destination terminal establishes, according to identification information of the remote terminal in the page information, a call connection used for bearing the to-be-transferred call with the remote terminal, so as to implement transferring of the to-be-transferred call from between the source terminal and the remote terminal to between the destination terminal and the remote terminal.

In a first possible implementation manner of the fourth aspect, the apparatus further includes an authentication information receiving module and an authentication executing module, where the authentication information receiving module is configured to, before sending the page information corresponding to the to-be-transferred call to the destination terminal, receive authentication information of a first token sent by the destination terminal, where the first token is a token allocated by a browser server for the destination terminal and used for identifying the destination terminal, the authentication executing module is configured to perform, according to a second token sent by the source terminal, authentication on the authentication information of the first token received by the authentication information receiving module, where the second token is acquired by the source terminal from the browser server, and is a token allocated by the browser server for the destination terminal and used for identifying the destination terminal, and the page sending module is specifically configured to, if it is determined through the authentication performed by the authentication executing module on the authentication information of the first token that the first token is the same as the second token, send the page information corresponding to the to-be-transferred call to the destination terminal.

With reference to the fourth aspect or the first possible implementation manner of the fourth aspect, in a second possible implementation manner, the apparatus further includes an identifier request receiving module configured to, before the page request receiving module receives the first request message used for requesting the page information corresponding to the to-be-transferred call and sent by the destination terminal according to the first identifier, receive a generation request for generating the first identifier, which is sent by the source terminal, and an identifier sending module configured to send the first identifier generated according to the generation request received by the identifier request receiving module to the source terminal, so that the source terminal sends the first identifier to the browser server, and the browser server sends the first identifier to the destination terminal.

With reference to the fourth aspect, or the first possible implementation manner of the fourth aspect, or the second possible implementation manner of the fourth aspect, in a third possible implementation manner, the apparatus further includes a first call request processing module configured to, after the page sending module sends the page information corresponding to the first identifier to the destination terminal, receive a call request message used for calling the remote terminal and sent by the destination terminal, send the call request message to the remote terminal, receive a response message returned by the remote terminal according to the call request message, and send the response message to the destination terminal, so that the destination terminal establishes the call connection with the remote terminal.

With reference to the fourth aspect, or the first possible implementation manner of the fourth aspect, or the second possible implementation manner of the fourth aspect, in a fourth possible implementation manner, the apparatus further includes: a second call request processing module and a release indicating module, where the second call request processing module includes a first receiving unit, a first changing unit, a first sending unit, a second receiving unit, a second changing unit, and a second sending unit; the first receiving unit is configured to, after the page sending module sends the page information corresponding to the to-be-transferred call to the destination terminal, receive a call request message used for calling the remote terminal and sent by the destination terminal, where the call request message includes a first session identifier corresponding to the destination terminal; the first changing unit is configured to change the first session identifier in the call request message received by the first receiving unit into a second session identifier corresponding to the source terminal; the first sending unit is configured to send the call request message changed by the first changing unit to the remote terminal; the second receiving unit is configured to receive a response message returned by the remote terminal according to the changed call request message, where the response message includes the second session identifier; the second changing unit is configured to change the second session identifier in the response message into the first session identifier; the second sending unit is configured to send the changed response message to the destination terminal, so that the destination terminal establishes the call connection with the remote terminal; and the release indicating module is configured to, after the destination terminal establishes the call connection with the remote terminal, send the source terminal a release indication message used for instructing the source terminal to release the to-be-transferred call.

In the embodiments of the present invention, a destination terminal, after acquiring an identifier of a to-be-transferred call, may acquire page information corresponding to the to-be-transferred call from a WebRTC server according to the identifier, and establish a call connection with a remote terminal according to identification information of the remote terminal in the page information, so that a WebRTC call between a source terminal and the remote terminal may be transferred to between the destination terminal and the remote terminal, thereby implementing transferring of a WebRTC call between terminals.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Ordinal numerals such as "first" and "second" mentioned in the embodiments of the present invention should be understood as being used for distinguishing only, unless they indeed represent orders according to a context.

Figure 1:
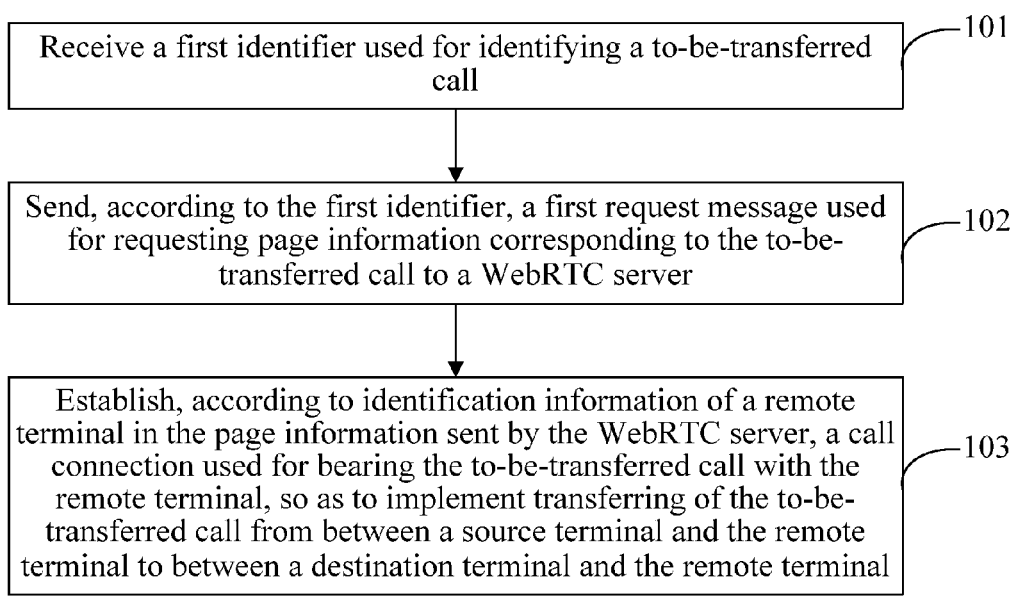
FIG. 1 is a flow chart of a WebRTC call transferring method according to an embodiment of the present invention.

FIG. 1 is a flow chart of a WebRTC call transferring method according to an embodiment of the present invention, and as shown in FIG. 1, the method includes:

Step 101: Receive a first identifier used for identifying a to-be-transferred call, where the to-be-transferred call is a WebRTC call having been established between a source terminal and a remote terminal.

In each embodiment of the present invention, a source terminal, a destination terminal, and a remote terminal are terminals supporting the WebRTC technology; that is, a user can log into a browser by using the source terminal, the destination terminal, or the remote terminal so as to perform a WebRTC-related service.

An application scenario of the embodiment of the present invention may be that a browser account of a user A is logged into on the source terminal, and the source terminal performs a video or audio call with the remote terminal by using the WebRTC technology, where the video or audio call performed by using the WebRTC technology is the WebRTC call described in the embodiment of the present invention. By means of the WebRTC call transferring method provided in the embodiment of the present invention, without dropping the call, the call being performed between the source terminal and the remote terminal may be transferred to be a call between a destination terminal and the remote terminal, in other words, the user A transfers the call with a user of the remote terminal from the source terminal to the destination terminal.

The method provided in the embodiment of the present invention is a method executed by the destination terminal. A browser account logged into on the source terminal is the same as that logged into on the destination terminal.

In step 101, the destination terminal may receive a first identifier sent by a browser server or another server. The first identifier is an identifier used for identifying a to-be-transferred call, and the to-be-transferred call is the WebRTC call between the source terminal and the remote terminal. The first identifier may be generated by the WebRTC server according to a request of the source terminal, and the WebRTC server, after generating the first identifier, sends the first identifier to the browser server or the another server by using the source terminal, so that the browser server or the another server sends the first identifier to the destination terminal.

Step 102: Send, according to the first identifier, a first request message used for requesting page information corresponding to the to-be-transferred call to a WebRTC server.

The destination terminal, after receiving the first identifier, requests page information corresponding to the first identifier from the WebRTC server, that is, requests the page information corresponding to the to-be-transferred call from the WebRTC server, where the page information is page resources of the to-be-transferred call currently being performed, and for example, the page resources may include resources such as a uniform resource locator (URL), user identifiers (IDs) of two parties of the call, a hypertext markup language (HTML) file, a Javascript file, or a picture.

Step 103: Establish, according to identification information of the remote terminal in the page information sent by the WebRTC server, a call connection used for bearing the to-be-transferred call with the remote terminal, so as to implement transferring of the to-be-transferred call from between the source terminal and the remote terminal to between the destination terminal and the remote terminal.

The destination terminal, after acquiring the page information corresponding to the to-be-transferred call sent by the WebRTC server, may call the remote terminal according to the identification information of the remote terminal in the page information, and establish a call connection with the remote terminal, where the call connection is used for bearing the to-be-transferred call. After the call connection is successfully established, and the connection between the source terminal and the remote terminal is released, the transferring of the WebRTC call is implemented.

In the embodiments of the present invention, a destination terminal, after acquiring an identifier of a to-be-transferred call, may acquire page information corresponding to the to-be-transferred call from a WebRTC server according to the identifier, and establish a call connection with a remote terminal according to identification information of the remote terminal in the page information, so that a WebRTC call between a source terminal and the remote terminal may be transferred to between the destination terminal and the remote terminal, thereby implementing transferring of a WebRTC call between terminals.

Figure 2:
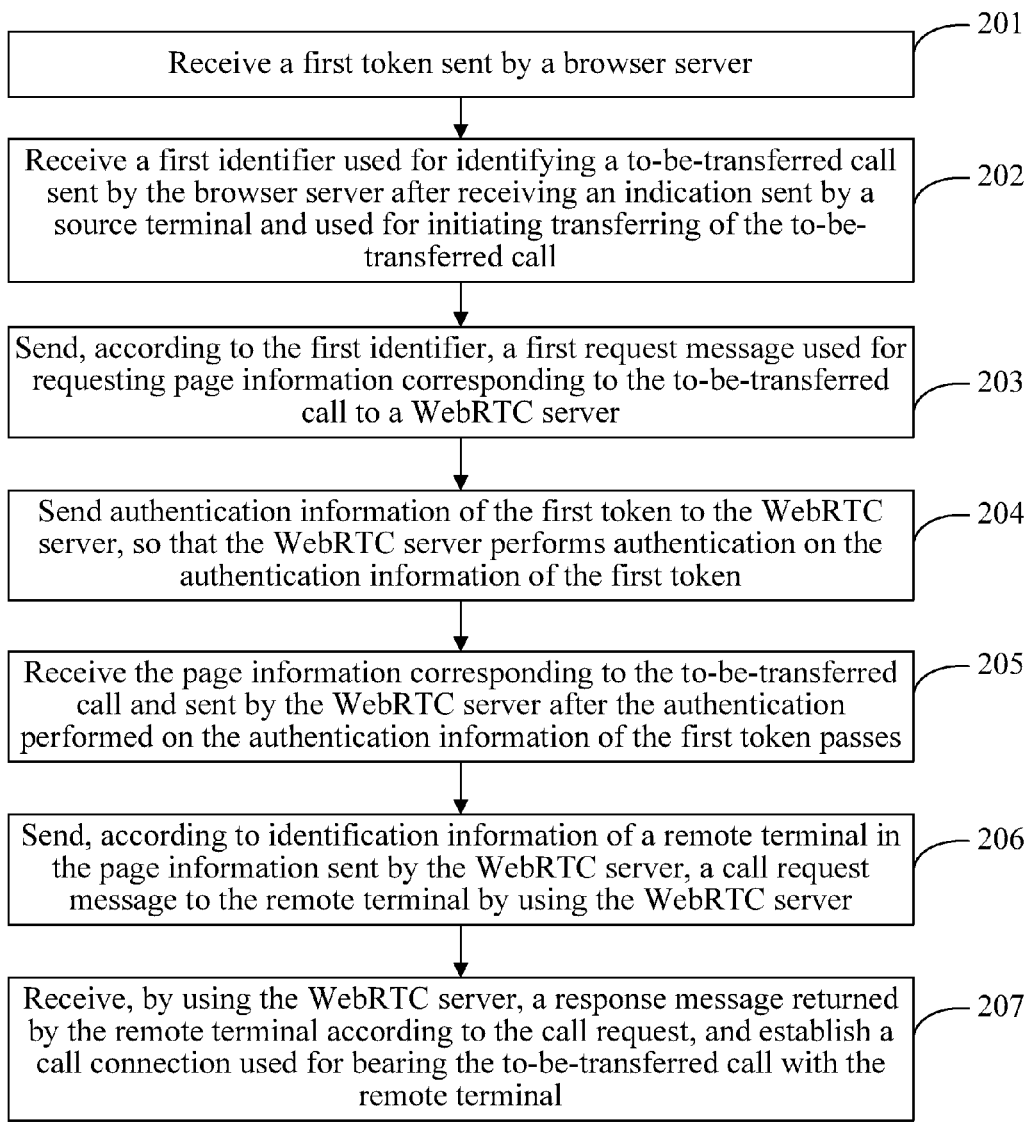
FIG. 2 is a flow chart of another WebRTC call transferring method according to an embodiment of the present invention.

FIG. 2 is a flow chart of another WebRTC call transferring method according to an embodiment of the present invention, and as shown in FIG. 2, on the basis of the embodiment shown in FIG. 1, the method may include:

Step 201: Receive a first token sent by a browser server. The first token is a token allocated by the browser server for a destination terminal and used for identifying the destination terminal.

As for an application scenario of the embodiment of the present invention, refer to the embodiment shown in FIG. 1, and the method provided in the embodiment of the present invention is a method executed by the destination terminal.

The destination terminal receives the first token sent by the browser server and allocated by the browser server for the destination terminal. The first token is used for identifying the destination terminal. When an account of a browser is logged into on the destination terminal, a browser server corresponding to the browser may allocate a token used for identifying an identity for the destination terminal, where the browser server may allocate a token for each terminal on which the browser is logged into.

Step 202: Receive a first identifier used for identifying the to-be-transferred call sent by the browser server after receiving an indication sent by a source terminal and used for initiating transferring of the to-be-transferred call.

After the browser server receives the indication sent by the source terminal and used for initiating transferring of the to-be-transferred call, the destination terminal receives the first identifier used for identifying the to-be-transferred call sent by the browser server according to the indication. Step 101 in the embodiment shown in FIG. 1 may specifically be step 202.

During a process that the source terminal and the remote terminal perform a WebRTC call, when the call is to be transferred to between the destination terminal and the remote terminal, the source terminal may send an indication to the browser server, so as to instruct the browser server to send the first identifier used for identifying the current to-be-transferred call to the destination terminal.

A browser account logged into on the source terminal is the same as that logged into on the destination terminal, so that the source terminal may learn, by using the browser server, that the destination terminal is an optional terminal to be transferred to, and after the source terminal selects the destination terminal to serve as the terminal to be transferred to, the source terminal may inform the browser server of a selection result, and specifically, the browser server may be informed in the following manner: the source terminal sends an indication used for initiating transferring of the to-be-transferred call to the browser server, where the indication may include indication information indicating that the destination terminal is a terminal to be transferred to.

In another implementation manner, a browser account logged into on the source terminal may be different from that logged into on the destination terminal. The browser server may inform, by using a binding relationship between the source terminal and the destination terminal or by using a binding relationship between the browser accounts respectively logged into on the source terminal and the destination terminal, the source terminal of the optional terminal to be transferred to.

It should be noted that, the embodiment of the present invention does not limit the sequence of step 201 and step 202, that is, step 201 may be performed before step 202 or after step 202.

Step 203: Send, according to the first identifier, a first request message used for requesting page information corresponding to the to-be-transferred call to a WebRTC server.

As for this step, refer to the description of step 102 in the embodiment shown in FIG. 1.

Step 204: Send authentication information of the first token to the WebRTC server, so that the WebRTC server performs authentication on the authentication information of the first token.

The WebRTC server needs to authenticate the identity of the destination terminal, so as to verify whether the destination terminal is a terminal to be transferred to that is designated by the source terminal. Therefore, in step 204, the destination terminal sends the authentication information of the first token to the WebRTC server, and the WebRTC server performs authentication on the destination terminal. The authentication information of the first token is information for uniquely identifying the first token, and the authentication information may be, for example, a hash value of the first token or ciphertext information after encryption of the first token.

Step 205: Receive the page information corresponding to the to-be-transferred call and sent by the WebRTC server after the authentication performed on the authentication information of the first token passes.

After the authentication performed by the WebRTC server on the destination terminal passes, the destination terminal receives the page information corresponding to the to-be-transferred call and sent by the WebRTC server.

Step 206: Send, according to identification information of the remote terminal in the page information sent by the WebRTC server, a call request message to the remote terminal by using the WebRTC server.

The destination terminal sends the WebRTC server the call request message for the remote terminal according to the identification information of the remote terminal in the received page information corresponding to the to-be-transferred call, and the WebRTC server sends the processed call request message to the remote terminal or directly forwards the call request message to the remote terminal.

Step 207: Receive, by using the WebRTC server, a response message returned by the remote terminal according to the call request, and establish a call connection used for bearing the to-be-transferred call with the remote terminal.

The destination terminal receives the response message forwarded by the WebRTC server and returned by the remote terminal, and establishes the call connection with the remote terminal, where the call connection is used for bearing the to-be-transferred call.

In the embodiment of the present invention, a destination terminal may acquire, from a browser server, an identifier of a to-be-transferred call, acquire, according to the identifier, page information corresponding to the to-be-transferred call from a WebRTC server, and establish a call connection with a remote terminal according to identification information of the remote terminal in the page information, so that a WebRTC call between a source terminal and the remote terminal may be transferred to between the destination terminal and the remote terminal without dropping the call, thereby implementing seamless transferring of a WebRTC call between terminals; moreover, by means of an authentication process performed by the WebRTC server on the destination terminal, security of the call transferring process is increased, thereby ensuring that the call can be transferred to the designated destination terminal.

Figure 3:
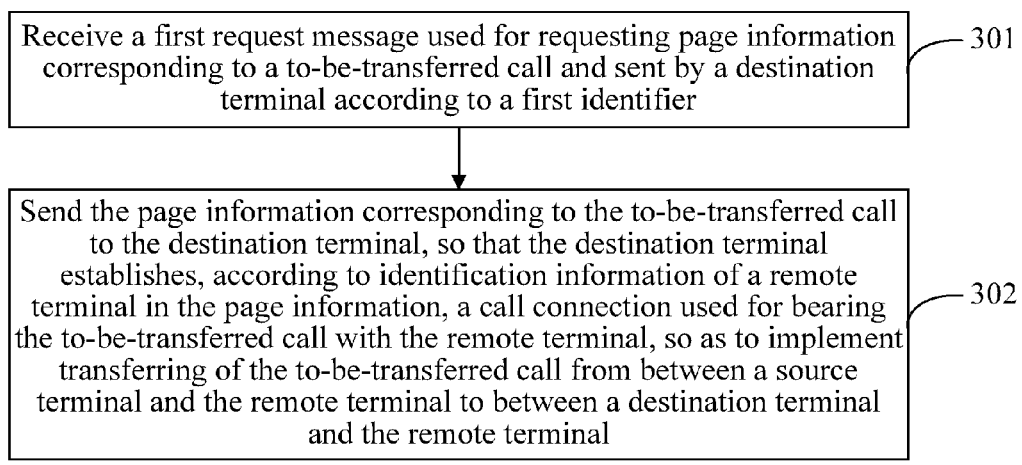
FIG. 3 is a flow chart of another WebRTC call transferring method according to an embodiment of the present invention.
Figure 4A:
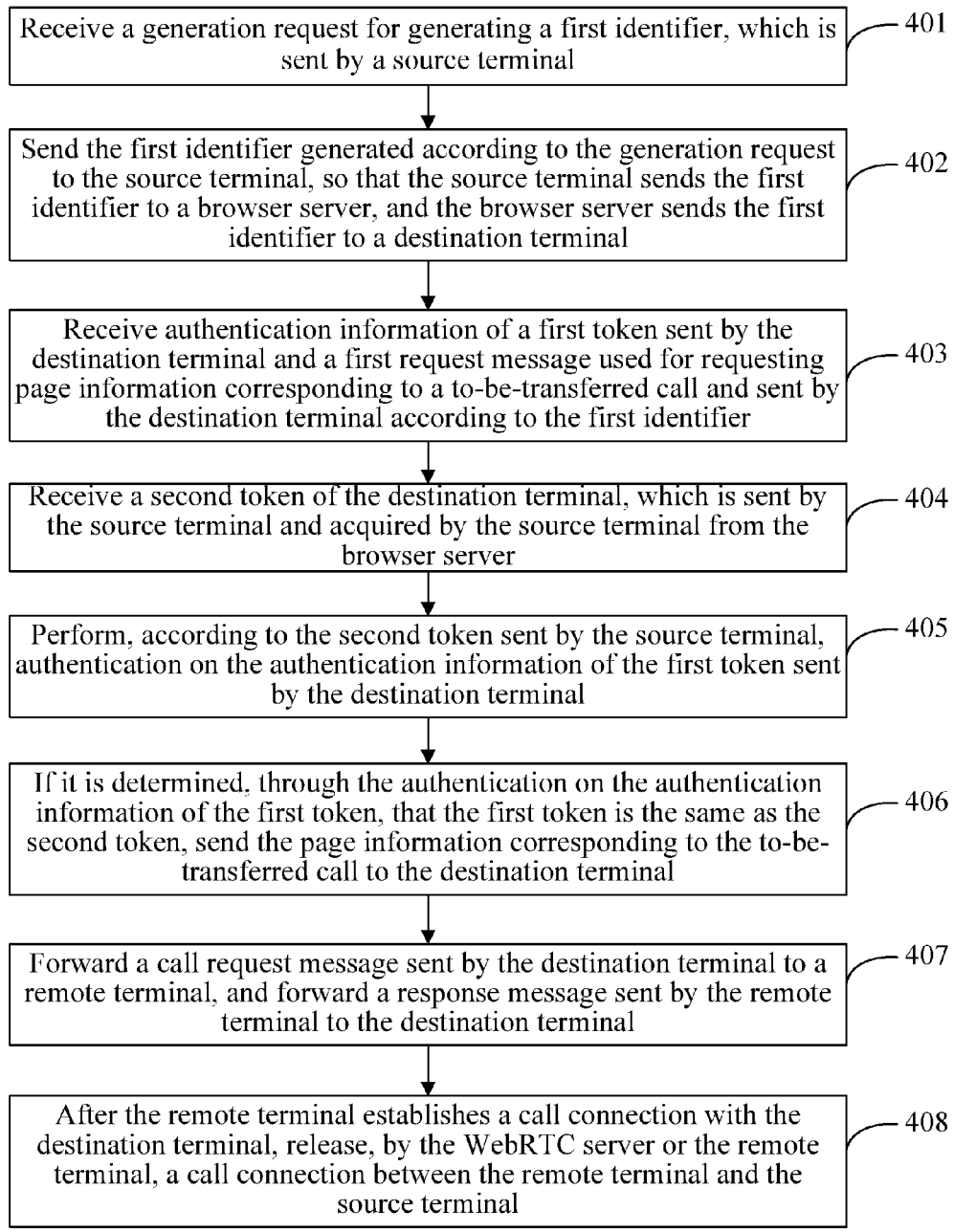
FIGS. 4A-4D are flow charts of another WebRTC call transferring method according to an embodiment of the present invention.
Figure 4B:
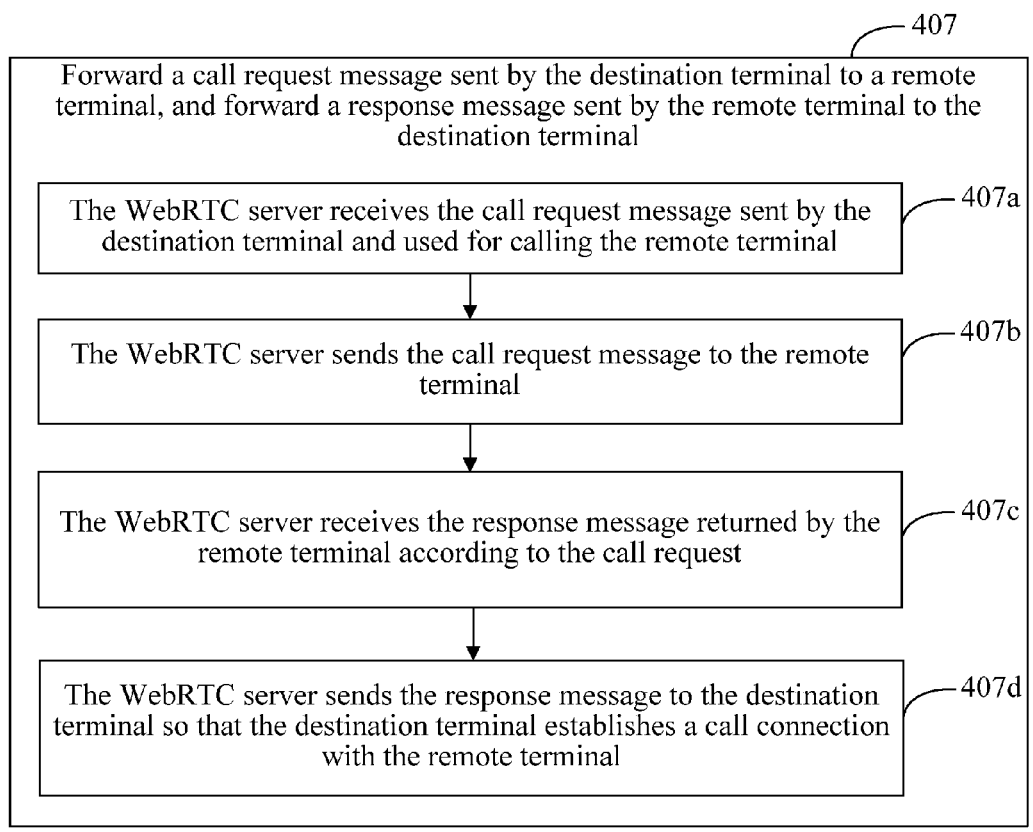
Figure 4C:
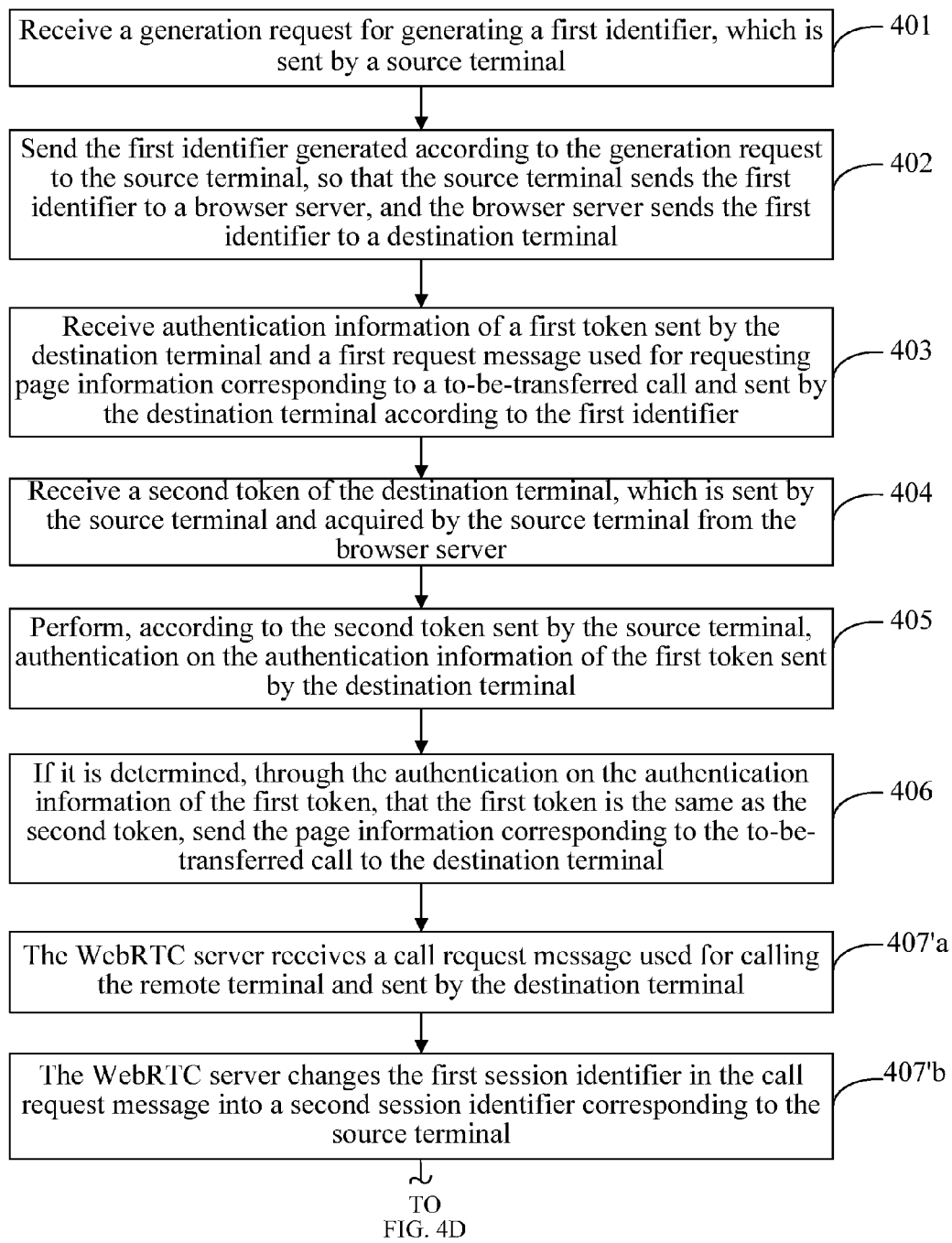
Figure 4D:
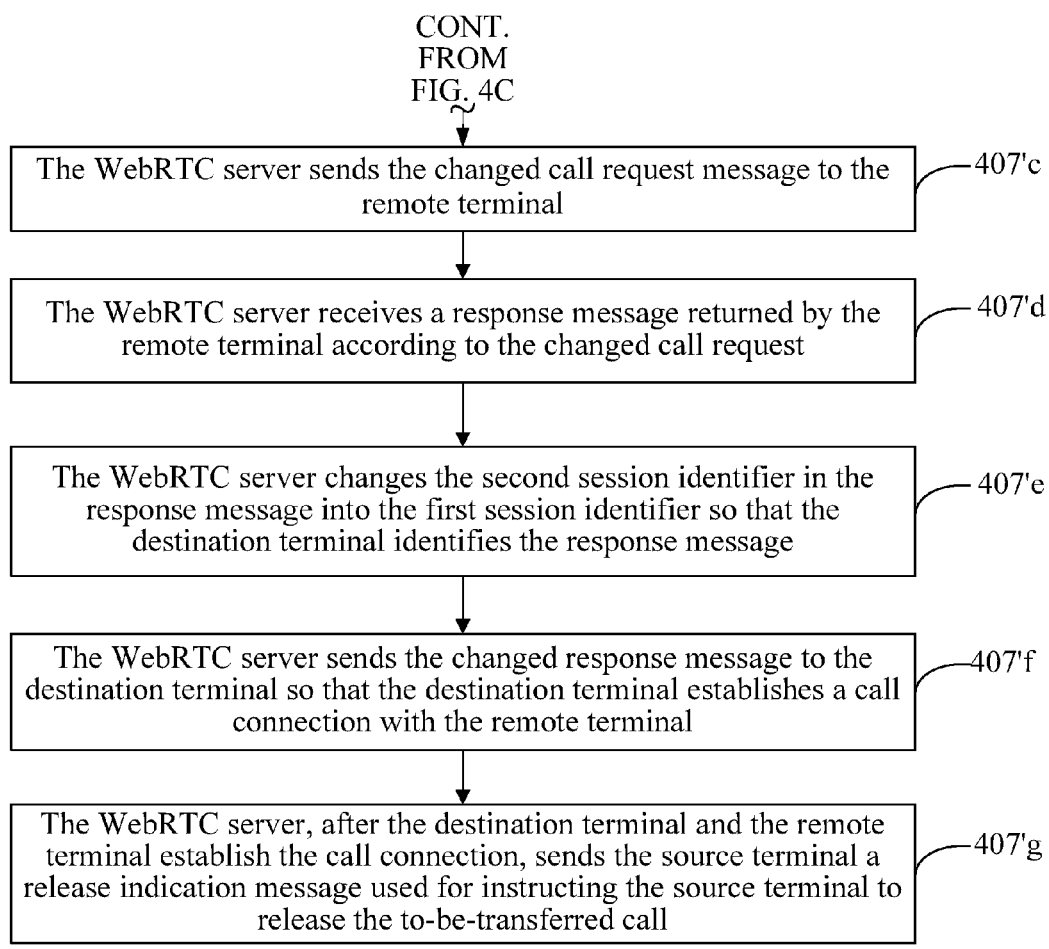

FIG. 3 is a flow chart of another WebRTC call transferring method according to an embodiment of the present invention, and as shown in FIG. 3, the method includes:

Step 301: Receive a first request message used for requesting page information corresponding to a to-be-transferred call and sent by a destination terminal according to a first identifier.

As for an application scenario of the embodiment of the present invention, refer to the description of the embodiment shown in FIG. 1. The method provided in the embodiment of the present invention is a method executed by a WebRTC server. A browser account logged into on the source terminal is the same as that logged into on the destination terminal.

In step 301, the WebRTC server receives the first request message sent by the destination terminal according to the first identifier, where the first request message is used for requesting the page information corresponding to the to-be-transferred call. The first identifier is used for identifying the to-be-transferred call, and the to-be-transferred call is a WebRTC call between the source terminal and a remote terminal.

Step 302: Send the page information corresponding to the to-be-transferred call to the destination terminal, so that the destination terminal establishes, according to identification information of the remote terminal in the page information, a call connection used for bearing the to-be-transferred call with the remote terminal, so as to implement transferring of the to-be-transferred call from between the source terminal and the remote terminal to between the destination terminal and the remote terminal.

The WebRTC server, after receiving the first request message sent by the destination terminal, sends the page information currently corresponding to the to-be-transferred call to the destination terminal, and the destination terminal may establish, according to the identification information of the remote terminal in the page information, a call connection with the remote terminal, where the call connection is used for bearing the to-be-transferred call.

In the embodiment of the present invention, a WebRTC server sends, according to a request of a destination terminal, page information corresponding to a to-be-transferred call to the destination terminal, so that the destination terminal establishes, according to identification information of a remote terminal in the page information, a call connection with the remote terminal, so that a WebRTC call between a source terminal and the remote terminal may be transferred to between the destination terminal and the remote terminal, thereby implementing seamless transferring of a WebRTC call between terminals.

FIGS. 4A-4D are flow charts of another WebRTC call transferring method according to an embodiment of the present invention, and as shown in FIGS. 4A-4D, on the basis of the embodiment shown in FIG. 3, the method includes:

Step 401: Receive a generation request for generating a first identifier, which is sent by a source terminal.

As for an application scenario of the embodiment of the present invention, refer to the embodiment shown in FIG. 1, and the method provided in the embodiment of the present invention is a method executed by a WebRTC server.

During the process that the source terminal and a remote terminal perform a WebRTC call, when the WebRTC call is to be transferred between a destination terminal and the remote terminal, the source terminal requests the WebRTC server to generate a first identifier of the to-be-transferred WebRTC call. The WebRTC server receives a generation request for generating the first identifier, which is sent by the source terminal.

Step 402: Send the first identifier generated according to the generation request to the source terminal, so that the source terminal sends the first identifier to a browser server, and the browser server sends the first identifier to the destination terminal.

The WebRTC server, after generating, according to the generation request, the first identifier used for identifying the to-be-transferred WebRTC call sends the first identifier to the source terminal, the source terminal may send the first identifier to the browser server, so that the browser server may send the first identifier to the destination terminal.

Step 403: Receive authentication information of a first token sent by the destination terminal and a first request message used for requesting page information corresponding to the to-be-transferred call and sent by the destination terminal according to the first identifier.

The WebRTC server receives the authentication information of the first token and the first request message sent by the destination terminal. The first token is a token allocated by the browser server for the destination terminal and used for identifying the destination terminal, and the destination terminal, when requesting the page information corresponding to the to-be-transferred call from the WebRTC server, further sends the authentication information of the first token to the WebRTC server so that the WebRTC server can perform authentication on the destination terminal.

Step 404: Receive a second token of the destination terminal, which is sent by the source terminal and acquired by the source terminal from the browser server.

After the browser server allocates a token for the destination terminal, the browser server sends, according to a request of the source terminal, the token identifying the destination terminal to the source terminal, and then, the WebRTC server receives a token of the destination terminal, which is sent by the source terminal, where, in order to be distinguished with the first token, a second token is used for representing the token. That is, the second token is a token acquired by the source terminal from the browser server, allocated by the browser server for the destination terminal, and used for identifying the destination terminal.

The embodiment of the present invention does not limit the sequence of step 403 and step 404.

Step 405: Perform, according to the second token sent by the source terminal, authentication on the authentication information of the first token sent by the destination terminal.

The WebRTC server performs authentication on the authentication information of the first token according to the second token. The specific authentication process is that the WebRTC server verifies whether the first token is the same as the second token. For example, when the authentication information of the first token is a hash value of the first token, the WebRTC server calculates a hash value of the second token, and compares the hash value of the second token with the hash value of the first token, and if they are the same, the first token is the same as the second token; otherwise, the first token is different from the second token.

It should be noted that, both the first token and the second token in the embodiment of the present invention are tokens generated by the browser server and used for identifying the destination terminal, and their difference is that the first token is a token sent by the browser server to the destination terminal, and the second token is a token sent by the browser server to the source terminal and used for identifying the destination terminal. If the destination terminal is a destination terminal designated by the source terminal during call transferring, the first token is the same as the second token; otherwise, the first token is different from the second token. When the first token is different from the second token, it indicates that the current destination terminal is not designated by the source terminal, and at this time, the authentication performed by the WebRTC server on the destination terminal fails so the call cannot be transferred to the destination terminal, thereby ensuring security of the call transferring.

Step 406: If it is determined, through the authentication on the authentication information of the first token, that the first token is the same as the second token, send the page information corresponding to the to-be-transferred call to the destination terminal.

After the authentication on the destination terminal passes, the WebRTC server sends the page information corresponding to the to-be-transferred call to the destination terminal according to a request of the destination terminal.

Step 407: Forward a call request message sent by the destination terminal to the remote terminal, and forward a response message sent by the remote terminal to the destination terminal, which may specifically include:

Step 407*a*: The WebRTC server receives the call request message sent by the destination terminal and used for calling the remote terminal, after the destination terminal acquires the page information corresponding to the to-be-transferred call, the destination terminal may send, according to identification information of the remote terminal in the page information, the call request message used for calling the remote terminal.

Step 407*b*: The WebRTC server sends the call request message to the remote terminal.

Step 407*c*: The WebRTC server receives the response message returned by the remote terminal according to the call request.

Step 407*d*: The WebRTC server sends the response message to the destination terminal so that the destination terminal establishes a call connection with the remote terminal.

Step 408: After the remote terminal establishes the call connection with the destination terminal, release, by the WebRTC server or the remote terminal, the call connection between the remote terminal and the source terminal.

After the call connection is established, the WebRTC server may instruct the source terminal to release the connection between the source terminal and the remote terminal, or the remote terminal may release the connection between the remote terminal and the source terminal, and after the connection between the source terminal and the remote terminal is released, the transferring of the WebRTC call is completed.

In the foregoing step 407, the WebRTC server directly forwards the request or response sent by the destination terminal or the remote terminal, and the implementation manner requires that the remote terminal supports the operation of the foregoing step 408, that is, the remote terminal, after establishing the connection with the destination terminal, may release the connection between the remote terminal and the source terminal. In another implementation manner, the WebRTC server may process and then send the request or response sent by the destination terminal or the remote terminal, which may be specifically the following step 407', so that the remote terminal does not need to support the operation of the foregoing step 408. In other words, the foregoing step 407 and step 408 may be replaced by the following step 407'. Step 407' may specifically include the following steps:

Step 407'*a*: The WebRTC server receives a call request message used for calling the remote terminal and sent by the destination terminal, where the call request message includes a first session identifier corresponding to the destination terminal.

Step 407'*b*: The WebRTC server changes the first session identifier in the call request message into a second session identifier corresponding to the source terminal; the WebRTC server changes the first session identifier into the second session identifier, so that the remote terminal considers the call request message as an update message sent by the source terminal.

Step 407'*c*: The WebRTC server sends the changed call request message to the remote terminal.

Step 407'*d*: The WebRTC server receives a response message returned by the remote terminal according to the changed call request, where the response message includes the second session identifier.

Step 407'*e*: The WebRTC server changes the second session identifier in the response message into the first session identifier so that the destination terminal identifies the response message.

Step 407'*f*: The WebRTC server sends the changed response message to the destination terminal so that the destination terminal establishes a call connection with the remote terminal.

Step 407'*g*: The WebRTC server, after the destination terminal and the remote terminal establish the call connection, sends the source terminal a release indication message used for instructing the source terminal to release the to-be-transferred call.

In the embodiment of the present invention, a WebRTC server sends, according to a request of a destination terminal, page information corresponding to a to-be-transferred call to the destination terminal, so that the destination terminal establishes, according to identification information of a remote terminal in the page information, a call connection with the remote terminal, so that a WebRTC call between a source terminal and the remote terminal may be transferred to between the destination terminal and the remote terminal without dropping the call, thereby implementing seamless transferring of a WebRTC call between terminals; moreover, the WebRTC server may further perform authentication on the destination terminal, which increases security of the call transferring procedure, thereby ensuring that the call can be transferred to the designated destination terminal.

Figure 5:
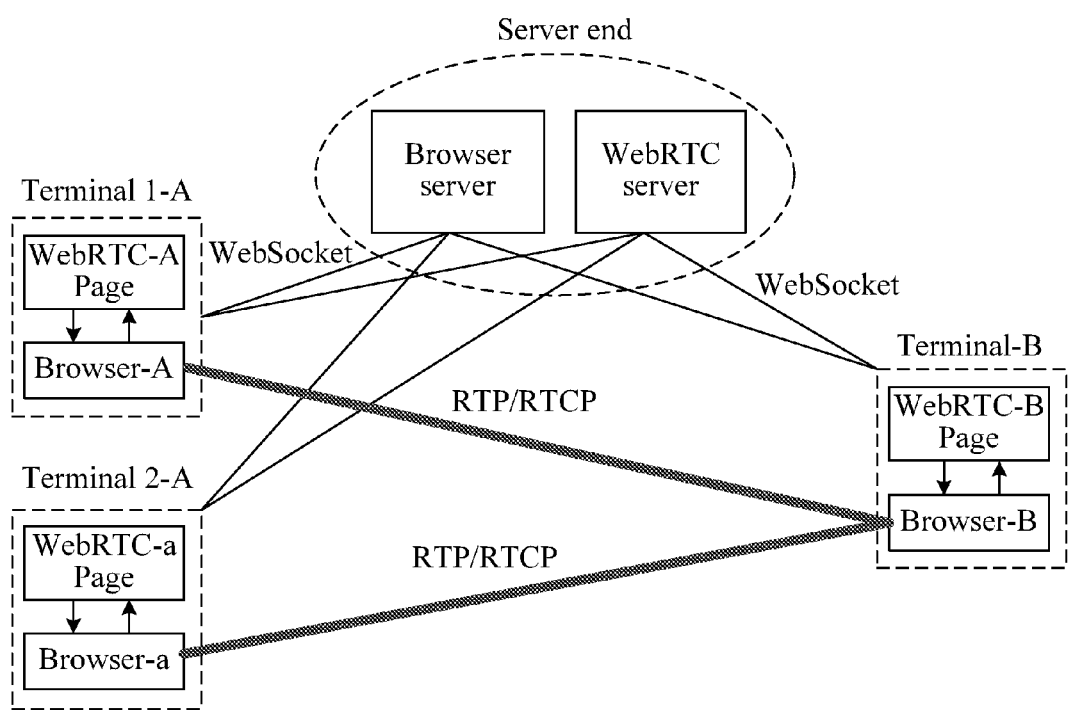
FIG. 5 is an architectural diagram of a network to which a WebRTC call transferring method provided in each embodiment of the present invention is applied.

FIG. 5 is an architectural diagram of a network to which a WebRTC call transferring method provided in each embodiment of the present invention is applied. As shown in FIG. 5, the network architecture includes a terminal 1-A, a terminal 2-A, a terminal-B, and a server end. The terminal 1-A and the terminal 2-A are two terminals of a user A, the terminal-B is a terminal of a user B, where, any of the foregoing terminals may be a terminal device such as a mobile phone, a tablet, a notebook computer, an ultra-mobile personal computer (UMPC), a netbook, or a personal digital assistant (PDA). The server end includes a browser server and a WebRTC server.

The terminal 1-A (or the terminal 2-A) performs session negotiation with the terminal-B through a channel established by the WebRTC server (for example, a websocket channel), and after the session negotiation succeeds, establishes a media stream path (a RTP/RTCP protocol is used therein) between the terminal 1-A (or the terminal 2-A) and the terminal-B so as to transmit an audio/video media stream. The terminal includes a WebRTC page and a browser, where the WebRTC page is also referred to as a WebRTC client. Specifically, the terminal 1-A includes a WebRTC-A page and a browser-A, the terminal 2-A includes a WebRTC-a page and a browser-a, and the terminal-B includes a WebRTC-B page and a browser-B.

The WebRTC call transferring method in the network architecture is described specifically in the following.

Figure 6:
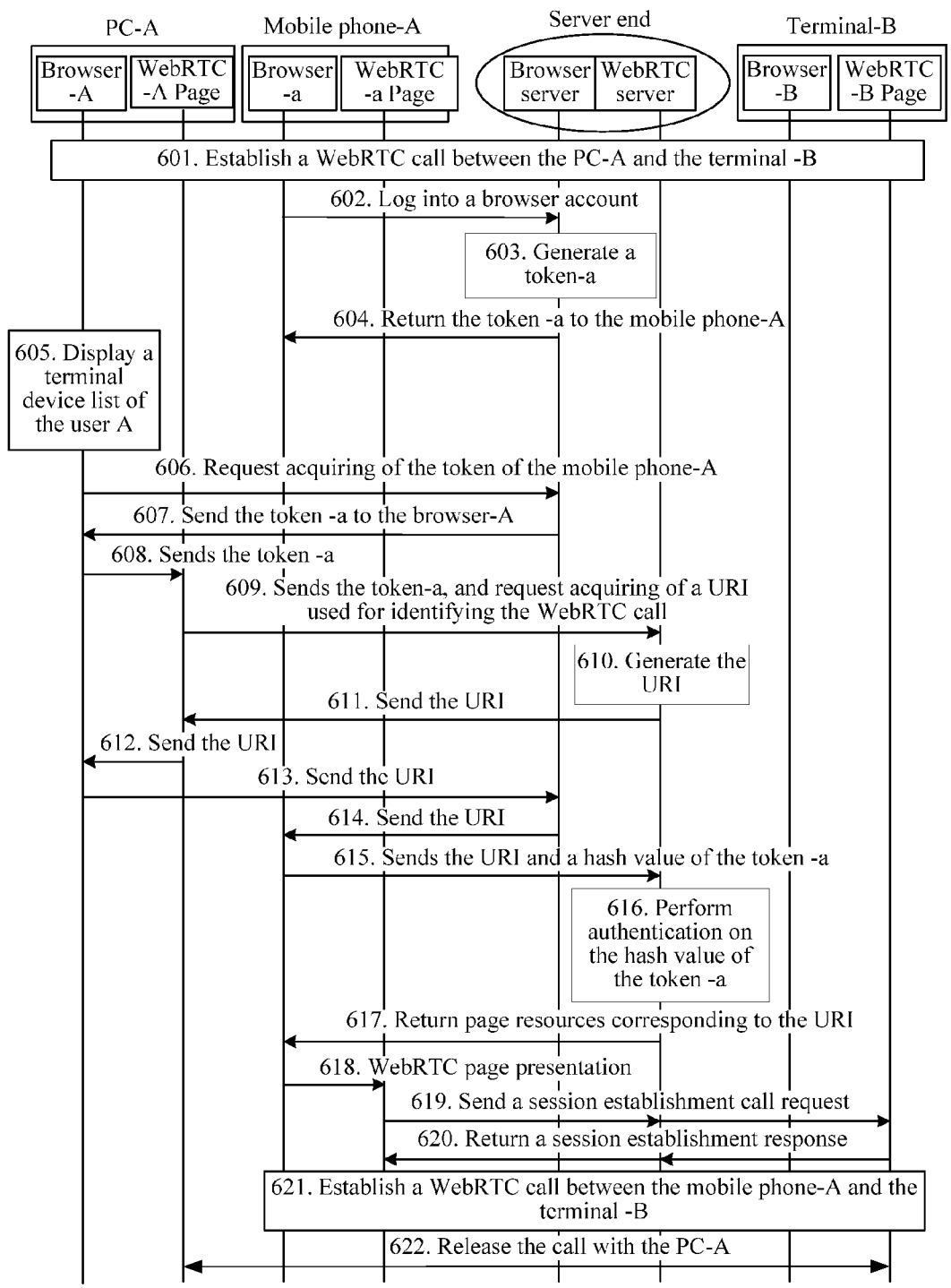
FIG. 6 is a signaling interaction diagram of a WebRTC call transferring method according to an embodiment of the present invention.

FIG. 6 is a signaling interaction diagram of a WebRTC call transferring method according to an embodiment of the present invention, and as shown in FIG. 6, on the basis of the embodiments shown in FIG. 1 to FIGS. 4A-4D, the method includes:

Step 601: The user A logs into a browser account on a PC-A, opens a WebRTC page, logs into a WebRTC account, and establishes a WebRTC call with the user B, that is, establishes a WebRTC call between the PC-A and the terminal-B.

The method provided in each embodiment of the present invention may implement seamless transferring of a WebRTC call being performed between two terminals of a same user. The two terminals of the same user may be any one or two types of terminals of a mobile phone, a tablet, a notebook computer, a UMPC, a netbook, or a PDA, and the two terminals may be of a same type or of different types; for example, the two terminals of the same user may be a mobile phone 1 and a mobile phone 2, or a mobile phone and a PC. In this embodiment, an example that the two terminals of the same user is the PC-A and a mobile phone-A is used for illustration, and an example that a WebRTC call is transferred from the PC-A to the mobile phone-A is used, where the WebRTC call may be a video call or an audio call.

The PC-A in the embodiment of the present invention is equivalent to the source terminal in each foregoing embodiment, the mobile phone-A is equivalent to the destination terminal in each foregoing embodiment, and the terminal-B is equivalent to the remote terminal in each foregoing embodiment.

Step 602: The user A logs into a browser account on the mobile phone-A.

The user A logs into the same browser account on the PC-A and the mobile phone-A, and the browser server of the server end maintains information about the user A logging into the PC-A and the mobile phone-A.

Step 603: The browser server generates a token-a for the mobile phone-A.

The token is used for uniquely identifying the mobile phone-A, for example, a corresponding token may be generated according to a device ID of the mobile phone-A. It should be noted that, the browser server may allocate a corresponding token for each terminal on which the browser account is logged into.

Step 604: The browser server returns the token-a to the mobile phone-A.

The browser server, after generating the token for the terminal, returns the token to the corresponding terminal.

Step 605: The PC-A displays a terminal device list of the user A according to a request of the user A for transferring a WebRTC call, for the user A to select a terminal to be transferred to, that is, for the user A to select a destination terminal.

When the user A expects to transfer the current WebRTC call from the PC-A to the mobile phone-A, the user may initiate a request, for example, trigger a corresponding operation on a user interface of the PC-A, specifically, for example, click a "webrtc fly" button on the browser. Therefore, the PC-A may acquire a request for call transferring sent by the user A.

After the browser account is logged into on the terminal, the browser server may maintain information about the terminal on which the browser account is logged into. Therefore, after the user triggers the transferring request, the PC-A may request a list of terminal devices on which currently the browser account of the user A is logged into from the browser server, and displays the terminal device list to the user A, so that the user A may select the terminal to be transferred to from the terminal device list. When a browser account logged into on the mobile phone-A is the same as that logged into on the PC-A, the terminal device list displayed on the PC-A includes the mobile phone-A, and the user A may select to transfer the WebRTC call to the mobile phone-A.

Step 606: The browser-A requests acquiring of the token of the mobile phone-A from the browser server. The browser-A is a browser of the PC-A.

After the user A selects to transfer the WebRTC call to the mobile phone-A, the browser-A requests acquiring of the token of the mobile phone-A from the browser server.

Step 607: The browser server sends the token-a to the browser-A.

Step 608: The browser-A sends the token-a to the WebRTC-A page, and triggers the WebRTC-A page to perform step 609.

Step 609: The WebRTC-A page initiates a request to the WebRTC server, so as to request acquiring of a unique identity used for identifying the WebRTC call, carries the token-a of the mobile phone-A in the request, and sends the token-a to the WebRTC server.

The unique identity is equivalent to the first identifier in each foregoing embodiment, and may be, for example, a uniform resource identifier (URI), and the URI is used as an example for illustration in the following.

Step 610: The WebRTC server generates the unique identity of the WebRTC call, for example, URI.

Step 611: The WebRTC server returns the generated URI to the WebRTC-A page.

Step 612: The WebRTC-A page sends the acquired URI to the browser-A.

It should be noted that, in the foregoing step 608 to step 612, the browser interacts with the WebRTC page, and the WebRTC page interacts with the WebRTC server so as to acquire the URI. In another implementation manner, the foregoing step 608 to step 612 may also be replaced by a step in which the browser interacts with the WebRTC server without using the WebRTC page. Therefore, step 608 to step 612 may be replaced by: the browser-A sends a request to the WebRTC server so as to request acquiring of a URI identifying the WebRTC call, and carries the token-a in the request, and the WebRTC server generates the URI of the WebRTC call, and then returns the generated URI to the browser-A.

Step 613: The browser-A initiates a transferring process to the URI, and sends the URI of the WebRTC call to the browser server.

Step 614: The browser server sends the URI to the browser-a of the mobile phone-A.

In the embodiment of the present invention, the browser server has a push function, and after the browser-A initiates the transferring process to the URI, the browser server may use a push server to push the URI to the browser-a.

Step 615: The browser-a sends the URI and authentication information of the token-a to the WebRTC server, where the authentication information is, for example, a hash value (Hash-2).

The browser-a requests a page corresponding to the URI from the WebRTC server, and carries the authentication information of the token-a in a request message. The authentication information of the token-a may be, for example, a hash value of the token-a.

Step 616: The WebRTC server performs authentication on the hash value (Hash-2) of the token-a sent by the mobile phone-A, and if the authentication passes, considers the mobile phone-A as a valid device and performs step 617, and if the authentication fails, ends the procedure.

The specific authentication process may be: the WebRTC server calculates the hash value of the token-a sent by the WebRTC-A page in step 609, so as to obtain Hash-1, and compares Hash-2 and Hash-1 to check whether they are the same, and if they are the same, the authentication passes. The step of the WebRTC server calculating Hash-1 may be performed after step 609 and before step 616. A same hash algorithm should be used to calculate Hash-2 and Hash-1.

Step 617: The WebRTC server returns page resources corresponding to the URI to the mobile phone-A.

The page resources are equivalent to the page information in the foregoing embodiments. Specifically, the page resources may carry, for example, Javascript code used for automatically initiating a call to the terminal-B.

Step 618: The browser-a presents the WebRTC page according to the received page resources, and executes a Javascript script in the page resources to trigger step 619.

Step 619: The WebRTC-a page initiates a session establishment call request to the terminal-B by using the WebRTC server.

The presented WebRTC page automatically initiates, according to code (for example, the Javascript code) in the page, the call request to the terminal-B, where the code in the page includes the identifier of the terminal-B, and the call request message may carry a session description protocol (SDP) offer of the mobile phone-A.

Step 620: The terminal-B returns a session establishment response, where the response message carries a SDP answer.

Step 621: A call connection between the mobile phone-A and the terminal-B is established successfully, where the call connection bears a to-be-transferred WebRTC call, that is, a WebRTC call between the mobile phone-A and the terminal-B is established.

Step 622: The terminal-B releases a previous call, that is, releases the call with the PC-A. After the release succeeds, the mobile phone-A and the terminal-B may perform the WebRTC call, so that transferring of the WebRTC call is implemented.

After step 621, two WebRTC calls (one call with the PC-A, and the other call with the mobile phone-A) are maintained on the WebRTC page of the terminal-B at the same time. Therefore, the WebRTC page of the terminal-B needs to be enhanced, so that it can identify the scenario, and automatically release the previous call (that is, the call with the PC-A).

In the embodiment of the present invention, a WebRTC server dynamically generates a unique identifier for a WebRTC call being performing, and pushes the unique identifier to a mobile phone-A by using a browser server, a WebRTC page on the mobile phone-A may automatically initiate a call to a terminal-B according to page resources corresponding to the unique identifier, thereby implementing seamless transferring of a WebRTC call between different terminals of a user, and saving a procedure of the user performing WebRTC account login on the mobile phone-A, which is convenient for the user to use. Moreover, validity authentication performed by the WebRTC server on the mobile phone-A may be implemented by allocating a token for the mobile phone-A.

Figure 7:
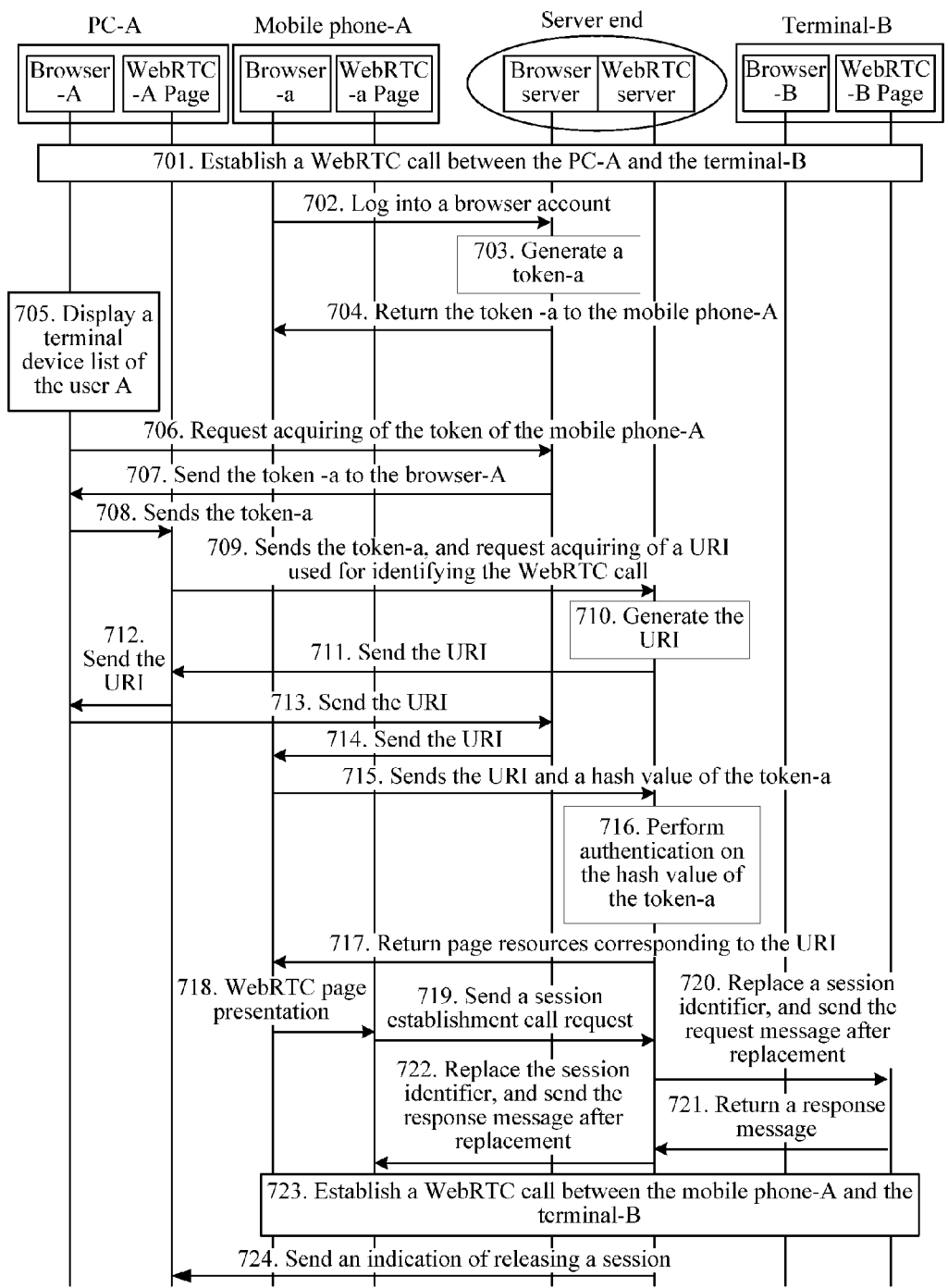
FIG. 7 is a signaling interaction diagram of another WebRTC call transferring method according to an embodiment of the present invention.

FIG. 7 is a signaling interaction diagram of another WebRTC call transferring method according to an embodiment of the present invention, and as shown in FIG. 7, on the basis of the embodiments shown in FIG. 1 to FIGS. 4A-4D, the method differs from the method of the embodiment shown in FIG. 6 only in step 719 to step 723, where step 701 to step 718 are the same as step 601 to step 618 in the embodiment shown in FIG. 6. The steps different from those in the embodiment shown in FIG. 6 are introduced specifically in the following. The method includes:

Step 701 to step 718: Refer to the embodiment shown in FIG. 6, which are not repeated herein.

Step 719: The WebRTC-a page sends the WebRTC server a session establishment call request used for calling the terminal-B.

The presented WebRTC page automatically initiates, according to code in the page, the call request to the terminal-B, where the code in the page includes the identifier of the terminal-B, and the call request message may carry a SDP Offer of the mobile phone-A.

Step 720: The WebRTC server, after receiving the request sent by the WebRTC-a page of the mobile phone-A, replaces a session identifier (session-id) in the request with a session identifier of a WebRTC call between the PC-A and the terminal-B, and forwards the request message after replacement to the terminal-B.

The WebRTC server replaces the session identifier, so that the terminal-B considers the request as an update request sent by the PC-A, and at this time, the terminal-B does not know existence of the mobile phone-A.

Step 721: The terminal-B returns a response message of the WebRTC session, where the response message carries a SDP answer.

Step 722: The WebRTC server modifies the response message sent by the terminal-B, replaces the session identifier in the response message with the WebRTC session identifier initiated by the mobile phone-A, and sends the response message to the mobile phone-A.

Step 723: The WebRTC call between the mobile phone-A and the terminal-B is successfully established.

Step 724: The WebRTC server sends an indication of releasing a session to the PC-A, so as to instruct the PC-A to release the current WebRTC call with the terminal-B.

The embodiment of the present invention has the beneficial effect of the embodiment shown in FIG. 6; for details, refer to the description in the embodiment shown in FIG. 6. Moreover, in the embodiment of the present invention, because the WebRTC server can modify the session identifier, it is not required to perform extension on the remote terminal (the terminal-B).

Figure 8:
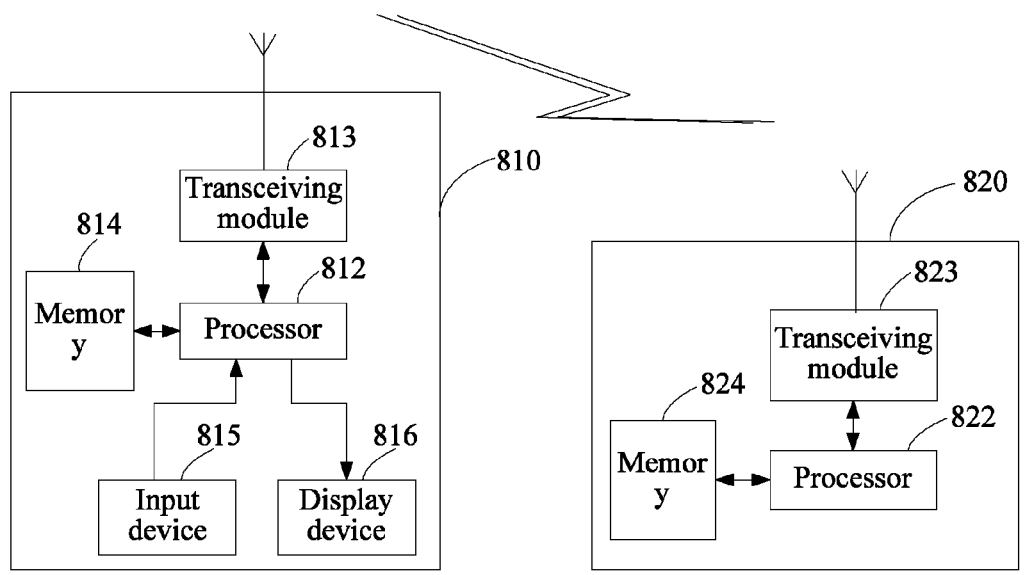
FIG. 8 is a schematic diagram of hardware of a WebRTC call transferring apparatus according to an embodiment of the present invention.

FIG. 8 is a schematic diagram of hardware of a WebRTC call transferring apparatus according to an embodiment of the present invention. The WebRTC call transferring apparatus may be a terminal device or a WebRTC server, where the terminal device may be a mobile phone, a tablet, a notebook computer, a UMPC, a netbook, a PDA, or the like, and in this embodiment, an example where the terminal device is a mobile phone is used for illustration. The mobile phone provided in the embodiment of the present invention is the destination terminal in each foregoing embodiment, the mobile phone and the WebRTC server provided in the embodiment of the present invention are configured to implement the methods shown in FIG. 1 to FIG. 7. For ease of illustration, only parts related to the embodiment of the present invention are shown. For technical details not disclosed herein, please refer to the embodiments shown in FIG. 1 to FIG. 7.

As shown in FIG. 8, a mobile phone 810 includes a processor 812, a transceiving module 813, a memory 814, an input device 815, and a display device 816. A WebRTC server 820 includes a processor 822, a memory 824, and a transceiving module 823.

The processor 812 of the mobile phone 810 is a control center of the mobile phone 810, the processor 822 of the WebRTC server 820 is a control center of the WebRTC server. The processor 812 and the processor 822 execute, respectively by running or executing software programs and/or modules stored in the memory 814 and the memory 824 and invoking data stored in the memory 814 and the memory 824, various functions and data processing of the mobile phone 810 or the WebRTC server 820, thereby performing transferring on a WebRTC call.

Optionally, the processor 812 may include one or more processing units. The processor 812 may integrate an application processor and a modem processor, where the application processor mainly processes an operating system, a user interface, an application program, and the like, and the modem processor mainly processes wireless communication. It can be understood that, the modem processor may also not be integrated in the processor 812.

The transceiving module 813 and the transceiving module 823 may be configured to receive and send a signal during the process of receiving and sending information or during calling, particularly, as for the mobile phone 810, receive downlink information of a base station for being processed by the processor 812, and send uplink data to the base station. Generally, the transceiving module may be a radio frequency (RF) circuit, which includes but is not limited to an antenna, at least one amplifier, a transceiver, a coupler, a low noise amplifier (LNA), a duplexer, and the like. Moreover, the transceiving module 813 and the transceiving module 823 may also communicate with a network and another device by using wireless communication. The wireless communication may use any communication standard or protocol, which includes but is not limited to global system of mobile communication (GSM), general packet radio service (GPRS), code division multiple access (CDMA), wideband code division multiple access (WCDMA), long term evolution (LTE), an email, short messaging service (SMS), or the like.

The memory 814 and the memory 824 may be configured to store software programs and modules, and the processor 812 and the processor 822 respectively execute, by running the software programs and modules stored in the memory 814 and the memory 824, various functional applications and data processing of the mobile phone 810 or the WebRTC server 820. The memory 814 and the memory 824 may mainly include a program storage area and a data storage area, where the program storage area may store an operating system, an application program (such as a sound playing function or an image playing function) required by at least one function, and the like; the data storage area may store data (such as audio data and a telephone directory) created according to the use of the mobile phone 810 or the WebRTC server 820, and the like. Moreover, the memory 814 and the memory 824 may include a high-speed random access memory, and may also include a non-volatile memory, for example, at least one magnetic disk memory, a flash memory, or another non-volatile solid memory.

The input device 815 may be configured to receive input number or character information, so as to generate a key signal input related to user setting and function control of the mobile phone 810. Specifically, the input device 815 may include a touch control panel and another input device. The touch control panel is also referred to as a touchscreen, which can collect a touch operation of a user on it or near it (for example, an operation of the user performed on the touch control panel or near the touch control panel by using any suitable object or accessory such as a finger or a stylus), and drive a corresponding connection apparatus according to a preset program. Optionally, the touch control panel may include two parts, that is, a touch detection apparatus and a touch controller. The touch detection apparatus detects a touch direction of the user, detects a signal brought by a touch operation, and transmits the signal to the touch controller; the touch controller receives touch information from the touch detection apparatus, converts the touch information into touch point coordinates, sends the touch point coordinates to the processor, and receives a command sent from the processor and executes the command. Moreover, the touch control panel may be implemented in various types such as a resistive type, a capacitive type, an infrared type, and a surface acoustic wave type. In addition to the touch control panel, the input device 815 may further include another input device. Specifically, the another input device may include but is not limited to one or more of a physical keyboard, a function key (such as a volume control button and a switch button), a trackball, a mouse, a joystick, and the like.

The display device 816 may be configured to display information input by the user or information provided to the user and various menus of the mobile phone 810. The display device 816 may include a display panel, and optionally, the display panel may be configured by adopting a form such as a liquid crystal display (LCD) or an organic light-emitting diode (OLED). Further, the touch control panel may cover the display panel, and after the touch control panel detects the touch operation on it or near it, the touch control panel transmits the touch operation to the processor 812 for determining a type of a touch event, and then the processor 812 provides a corresponding visual output on the display panel according to the type of the touch event.

In the embodiment of the present invention, the processor 812 of the mobile phone 810 is configured to receive, by using the transceiving module 813, a first identifier used for identifying a to-be-transferred call sent by a browser server, and stores the first identifier in the memory 814. Then, the processor 812 sends, according to the first identifier, a first request message used for requesting page information corresponding to the to-be-transferred call to a WebRTC server by using the transceiving module 813. The processor 812 further establishes, according to identification information of a remote terminal in the page information sent by the WebRTC server, a call connection used for bearing the to-be-transferred call with the remote terminal, so as to implement transferring of the to-be-transferred call from between a source terminal and the remote terminal to between the mobile phone 810 and the remote terminal.

Further, before establishing the call connection with the remote terminal according to the page information sent by the WebRTC server, the processor 812 of the mobile phone 810 is further configured to receive, by using the transceiving module 813, a first token sent by the browser server, store the first token in the memory 814, and send authentication information of the first token to the WebRTC server by using the transceiving module 813 so that the WebRTC server performs authentication on the authentication information of the first token. The processor 812 of the mobile phone 810 is further configured to receive, by using the transceiving module 813, the page information corresponding to the to-be-transferred call sent by the WebRTC server, where the page information corresponding to the to-be-transferred call is sent by the WebRTC server after the authentication performed on the authentication information of the first token passes.

Further, the processor 812 receiving, by using the transceiving module 813, a first identifier used for identifying a to-be-transferred call sent by a browser server may specifically include, after the browser server receives an indication sent by the source terminal and used for initiating transferring of the to-be-transferred call, the processor 812 receives, by using the transceiving module 813, the first identifier used for identifying the to-be-transferred call sent by the browser server. A browser account logged into on the source terminal may be the same as that logged into on the destination terminal, so that the source terminal may learn, by using the browser server, that the destination terminal is an optional terminal to be transferred to, where the indication sent by the source terminal and used for initiating transferring of the to-be-transferred call includes indication information used for indicating that the destination terminal is a terminal to be transferred to.

In the embodiment of the present invention, the processor 822 of the WebRTC server 820 is configured to receive, by using the transceiving module 823, the first request message used for requesting the page information corresponding to the to-be-transferred call and sent by the mobile phone 810 according to the first identifier, and send, by using the transceiving module 823, the page information corresponding to the to-be-transferred call to the mobile phone 810 so that the mobile phone 810 establishes, according to identification information of the remote terminal in the page information, a call connection used for bearing the to-be-transferred call with the remote terminal so as to implement transferring of the to-be-transferred call from between a source terminal and the remote terminal to between the mobile phone 810 and the remote terminal.

Further, the processor 822 may be specifically configured to receive, by using the transceiving module 823, authentication information of a first token sent by the mobile phone 810 and the first request message used for requesting the page information corresponding to the to-be-transferred call and sent by the mobile phone 810 according to the first identifier, and store the authentication information of the first token in the memory 824, receive, by using the transceiving module 823, a second token sent by the source terminal, store the second token in the memory 824, and perform authentication, according to the second token, on the authentication information of the first token sent by the mobile phone 810, and, if it is determined through the authentication performed on the authentication information of the first token that the first token is the same as the second token, send, by using the transceiving module 823, the page information corresponding to the to-be-transferred call to the mobile phone 810.

Further, before receiving the first request message used for requesting the page information corresponding to the to-be-transferred call and sent by the mobile phone 810 according to the first identifier, the processor 822 may further be configured to receive a generation request generating the first identifier sent by the source terminal, send the first identifier generated according to the generation request to the source terminal, so that the source terminal sends the first identifier to the browser server, and the browser server sends the first identifier to the mobile phone 810.

Figure 9:
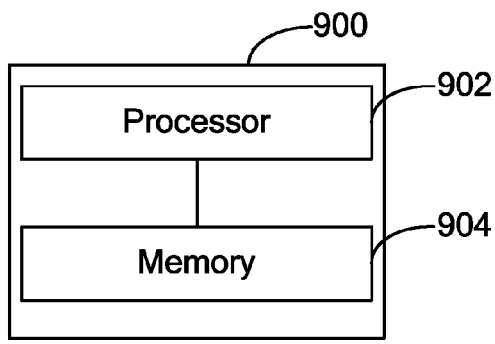
FIG. 9 is a schematic structural diagram of a WebRTC call transferring apparatus according to an embodiment of the present invention.

FIG. 9 is a schematic structural diagram of a WebRTC call transferring apparatus according to an embodiment of the present invention, where the WebRTC call transferring apparatus may be a terminal device. As shown in FIG. 9, the WebRTC call transferring apparatus 900 includes one or more processors 902, a memory 904, and one or more programs, where the one or more programs are stored in the memory 904 and are configured to be executed by the one or more processors 902, and the one or more programs include an instruction of receiving a first identifier used for identifying a to-be-transferred call, where the to-be-transferred call is a WebRTC call having been established between a source terminal and a remote terminal, an instruction of sending, according to the first identifier, a first request message used for requesting page information corresponding to the to-be-transferred call to a web real-time communication server, and an instruction of establishing, according to identification information of the remote terminal in the page information sent by the web real-time communication server, a call connection used for bearing the to-be-transferred call with the remote terminal, so as to implement transferring of the to-be-transferred call from between the source terminal and the remote terminal to between a destination terminal and the remote terminal.

Further, the one or more programs may further include, before the establishing, according to identification information of the remote terminal in the page information sent by the web real-time communication server, a call connection used for bearing the call to be transferred with the remote terminal, an instruction of receiving a first token sent by a browser server, where the first token is a token allocated by the browser server for the destination terminal and used for identifying the destination terminal, an instruction of sending authentication information of the first token to the web real-time communication server, so that the web real-time communication server performs authentication on the authentication information of the first token, and an instruction of receiving the page information corresponding to the to-be-transferred call and sent by the web real-time communication server after the authentication performed on the authentication information of the first token passes.

Further, the instruction of establishing, according to identification information of the remote terminal in the page information sent by the web real-time communication server, a call connection used for bearing the call to be transferred with the remote terminal may specifically include an instruction of sending, according to the identification information of the remote terminal in the page information sent by the web real-time communication server, a call request message to the remote terminal by using the web real-time communication server, and an instruction of receiving, by using the web real-time communication server, a response message returned by the remote terminal according to the call request message, and establishing the call connection used for bearing the to-be-transferred call with the remote terminal.

Further, the instruction of receiving the first identifier used for identifying the to-be-transferred call specifically includes an instruction of receiving the first identifier used for identifying the to-be-transferred call sent by the browser server after receiving an indication sent by the source terminal and used for initiating transferring of the to-be-transferred call, where a browser account logged into on the source terminal is the same as that logged into on the destination terminal, so that the source terminal learns, by using the browser server, that the destination terminal is an optional terminal to be transferred to, where the indication sent by the source terminal and used for initiating transferring of the to-be-transferred call includes indication information used for indicating that the destination terminal is a terminal to be transferred to.

In the embodiment of the present invention, a terminal device serving as a destination terminal may acquire, from a browser server, an identifier of a to-be-transferred call, acquire, according to the identifier, page information corresponding to the to-be-transferred call from a WebRTC server, and establish a call connection with a remote terminal according to the page information, so that a WebRTC call between a source terminal and the remote terminal may be transferred to between the destination terminal and the remote terminal without dropping the call, thereby implementing seamless transferring of a WebRTC call between terminals; moreover, by means of an authentication procedure performed by the WebRTC server on the destination terminal, security of the call transferring procedure is increased, thereby ensuring that the call can be transferred to the designated destination terminal.

Figure 10:
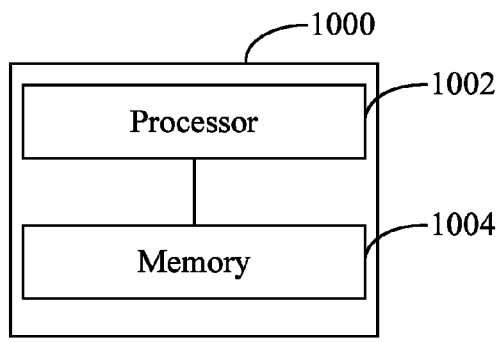
FIG. 10 is a schematic structural diagram of another WebRTC call transferring apparatus according to an embodiment of the present invention.

FIG. 10 is a schematic structural diagram of another WebRTC call transferring apparatus according to an embodiment of the present invention, where the WebRTC call transferring apparatus may be a WebRTC server. As shown in FIG. 10, the WebRTC call transferring apparatus 1000 includes one or more processors 1002, a memory 1004, and one or more programs, where the one or more programs are stored in the memory 1004 and are configured to be executed by the one or more processors 1002, and the one or more programs include: an instruction of receiving a first request message used for requesting page information corresponding to a to-be-transferred call and sent by a destination terminal according to a first identifier, where the first identifier is used for identifying the to-be-transferred call, and the to-be-transferred call is a WebRTC call having been established between a source terminal and a remote terminal, and an instruction of sending the page information corresponding to the to-be-transferred call to the destination terminal, so that the destination terminal establishes, according to identification information of the remote terminal in the page information, a call connection used for bearing the to-be-transferred call with the remote terminal, so as to implement transferring of the to-be-transferred call from between the source terminal and the remote terminal to between the destination terminal and the remote terminal.

Further, the one or more programs may further include before the sending the page information corresponding to the to-be-transferred call to the destination terminal, an instruction of receiving authentication information of a first token sent by the destination terminal, where the first token is a token allocated by a browser server for the destination terminal and used for identifying the destination terminal, and an instruction of performing, according to a second token sent by the source terminal, authentication on the authentication information of the first token sent by the destination terminal, where the second token is acquired by the source terminal from the browser server, and is a token allocated by the browser server for the destination terminal and used for identifying the destination terminal.

Further, the instruction of sending the page information corresponding to the to-be-transferred call to the destination terminal specifically includes if it is determined through the authentication performed on the authentication information of the first token that the first token is the same as the second token, an instruction of sending the page information corresponding to the to-be-transferred call to the destination terminal.

For example, the one or more programs may further include, before receiving the first request message used for requesting the page information corresponding to the to-be-transferred call and sent by the destination terminal according to the first identifier, an instruction of receiving a generation request for generating the first identifier, which is sent by the source terminal, and an instruction of sending the first identifier generated according to the generation request to the source terminal, so that the source terminal sends the first identifier to the browser server, and the browser server sends the first identifier to the destination terminal.

Further, the one or more programs may include, after sending the page information corresponding to the to-be-transferred call to the destination terminal, an instruction of receiving a call request message used for calling the remote terminal and sent by the destination terminal, an instruction of sending the call request message to the remote terminal, an instruction of receiving a response message returned by the remote terminal according to the call request, and an instruction of sending the response message to the destination terminal, so that the destination terminal establishes the call connection with the remote terminal.

Further, the one or more programs may include an instruction of releasing a call connection between the remote terminal and the source terminal after the remote terminal and the destination terminal establish the call connection.

Further, the one or more programs may include, after sending the page information corresponding to the to-be-transferred call to the destination terminal, an instruction of receiving a call request message used for calling the remote terminal and sent by the destination terminal, where the call request message includes a first session identifier corresponding to the destination terminal, an instruction of changing the first session identifier in the call request message into a second session identifier corresponding to the source terminal, an instruction of sending the changed call request message to the remote terminal, an instruction of receiving a response message returned by the remote terminal according to the changed call request message, where the response message includes the second session identifier, an instruction of changing the second session identifier in the response message into the first session identifier, an instruction of sending the changed response message to the destination terminal so that the destination terminal establishes the call connection with the remote terminal, and an instruction of sending the source terminal a release indication message used for instructing the source terminal to release the to-be-transferred call after the destination terminal establishes the call connection with the remote terminal.

In the embodiment of the present invention, a WebRTC server sends, according to a request of a destination terminal, page information corresponding to a to-be-transferred call to the destination terminal, so that the destination terminal establishes, according to the page information, a call connection with the remote terminal, so that a WebRTC call between a source terminal and the remote terminal may be transferred to between the destination terminal and the remote terminal without dropping the call, thereby implementing seamless transferring of a WebRTC call between terminals; moreover, the WebRTC server may further perform authentication on the destination terminal, which increases security of the call transferring procedure, thereby ensuring that the call can be transferred to the designated destination terminal.

Figure 11:
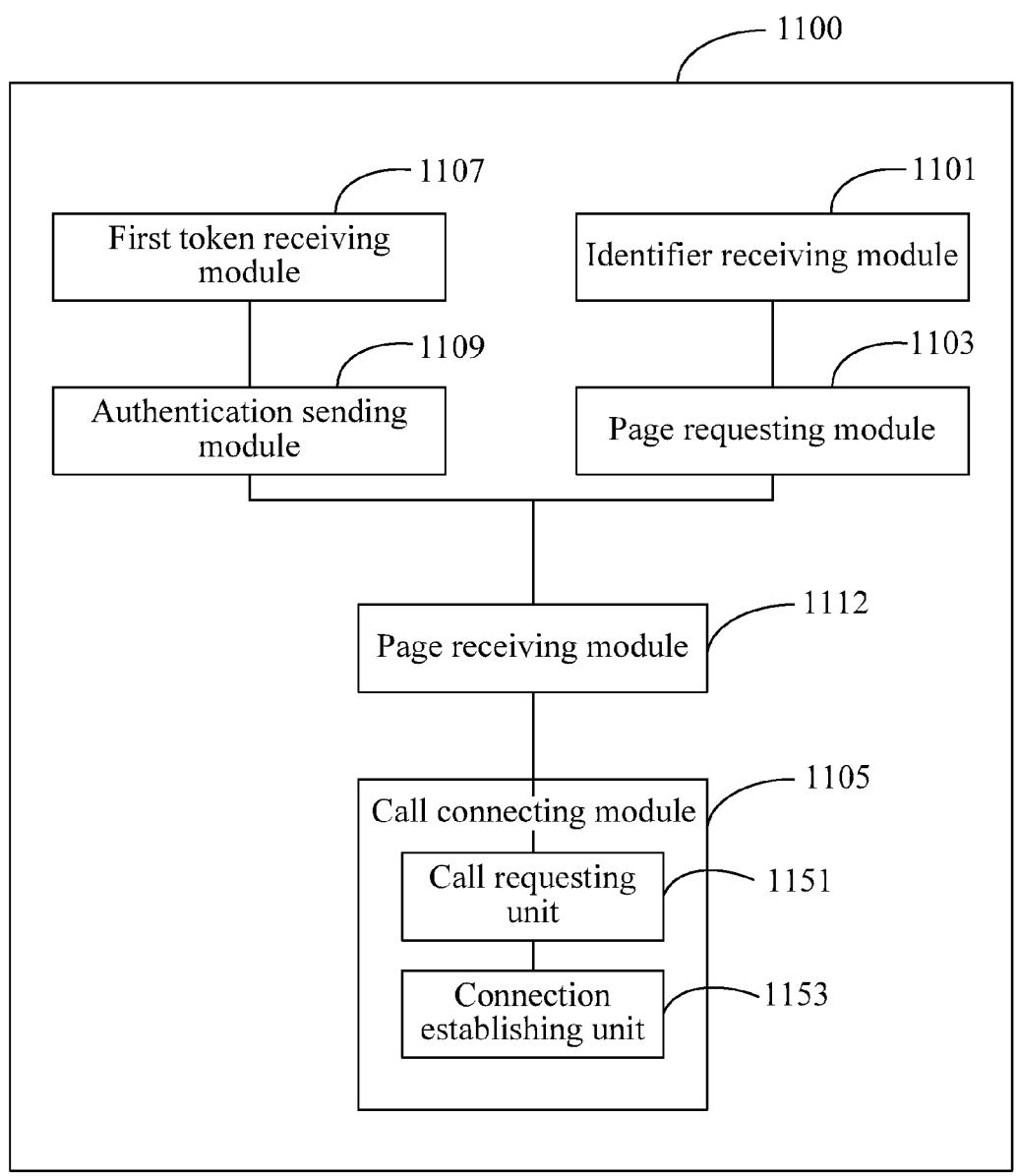
FIG. 11 is a schematic structural diagram of another WebRTC call transferring apparatus according to an embodiment of the present invention.

FIG. 11 is a schematic structural diagram of another WebRTC call transferring apparatus according to an embodiment of the present invention, where the WebRTC call transferring apparatus may be a terminal device. As shown in FIG. 11, the WebRTC call transferring apparatus 1100 includes an identifier receiving module 1101, a page requesting module 1103, and a call connecting module 1105.

The identifier receiving module 1101 is configured to receive a first identifier used for identifying a to-be-transferred call, where the to-be-transferred call is a WebRTC call having been established between a source terminal and a remote terminal.

The page requesting module 1103 is configured to send, according to the first identifier received by the identifier receiving module 1101, a first request message used for requesting page information corresponding to the to-be-transferred call to a WebRTC server.

The call connecting module 1105 is configured to establish, according to identification information of the remote terminal in the page information sent by the WebRTC server, a call connection used for bearing the to-be-transferred call with the remote terminal, so as to implement transferring of the to-be-transferred call from between the source terminal and the remote terminal to between a destination terminal and the remote terminal, where the page information is sent by the WebRTC server according to the first request message sent by the page requesting module 1103.

On the basis of the foregoing, in another implementation manner, the WebRTC call transferring apparatus 1100 may further include a first token receiving module 1107, an authentication sending module 1109, and a page receiving module 1112.

The first token receiving module 1107 is configured to, before the call connecting module 1105 establishes, according to the identification information of the remote terminal in the page information sent by the WebRTC server, the call connection used for bearing the to-be-transferred call with the remote terminal, receive a first token sent by a browser server, where the first token is a token allocated by the browser server for the destination terminal and used for identifying the destination terminal.

The authentication sending module 1109 is configured to, before the call connecting module 1105 establishes, according to the identification information of the remote terminal in the page information sent by the WebRTC server, the call connection used for bearing the to-be-transferred call with the remote terminal, send authentication information of the first token received by the first token receiving module 1107 to the WebRTC server, so that the WebRTC server performs authentication on the authentication information of the first token.

The page receiving module 1112 is configured to, before the call connecting module 1105 establishes, according to the identification information of the remote terminal in the page information sent by the WebRTC server, the call connection used for bearing the to-be-transferred call with the remote terminal, receive the page information corresponding to the to-be-transferred call and sent by the WebRTC server after the authentication performed on the authentication information of the first token passes.

Further, the call connecting module 1105 may specifically include a call requesting unit 1151 and a connection establishing unit 1153.

The call requesting unit 1151 is configured to send a call request message to the remote terminal by using the WebRTC server according to the identification information of the remote terminal in the page information sent by the WebRTC server, where the page information is sent by the WebRTC server according to the first request message sent by the page requesting module 1103.

The connection establishing unit 1153 is configured to receive, by using the WebRTC server, a response message returned by the remote terminal according to the call request message, and establish the call connection used for bearing the to-be-transferred call with the remote terminal.

Further, the identifier receiving module 1101 is specifically configured to receive the first identifier used for identifying the to-be-transferred call sent by the browser server after receiving an indication sent by the source terminal and used for initiating transferring of the to-be-transferred call. A browser account logged into on the source terminal is the same as that logged into on the destination terminal, so that the source terminal learns, by using the browser server, that the destination terminal is an optional terminal to be transferred to, where the indication sent by the source terminal and used for initiating transferring of the to-be-transferred call includes indication information used for indicating that the destination terminal is a terminal to be transferred to.

The terminal device provided in the embodiment of the present invention is equivalent to the destination terminal in each foregoing embodiment, and as for working principles and working procedures of the modules and units in the embodiment of the present invention, refer to the foregoing method embodiments.

In the embodiment of the present invention, an identifier receiving module of a destination terminal may acquire, from a browser server, an identifier of a to-be-transferred call, a page requesting module may acquire, according to the identifier, page information corresponding to the to-be-transferred call from a WebRTC server, and a call connecting module may establish a call connection with a remote terminal according to identification information of the remote terminal in the page information, so that a WebRTC call between a source terminal and the remote terminal may be transferred to between the destination terminal and the remote terminal without dropping the call, thereby implementing seamless transferring of a WebRTC call between terminals; moreover, by adding a first token receiving module and an authentication sending module, the WebRTC server is enabled to perform authentication on the destination terminal, security of the call transferring procedure is increased, thereby ensuring that the call can be transferred to the designated destination terminal.

Figure 12:
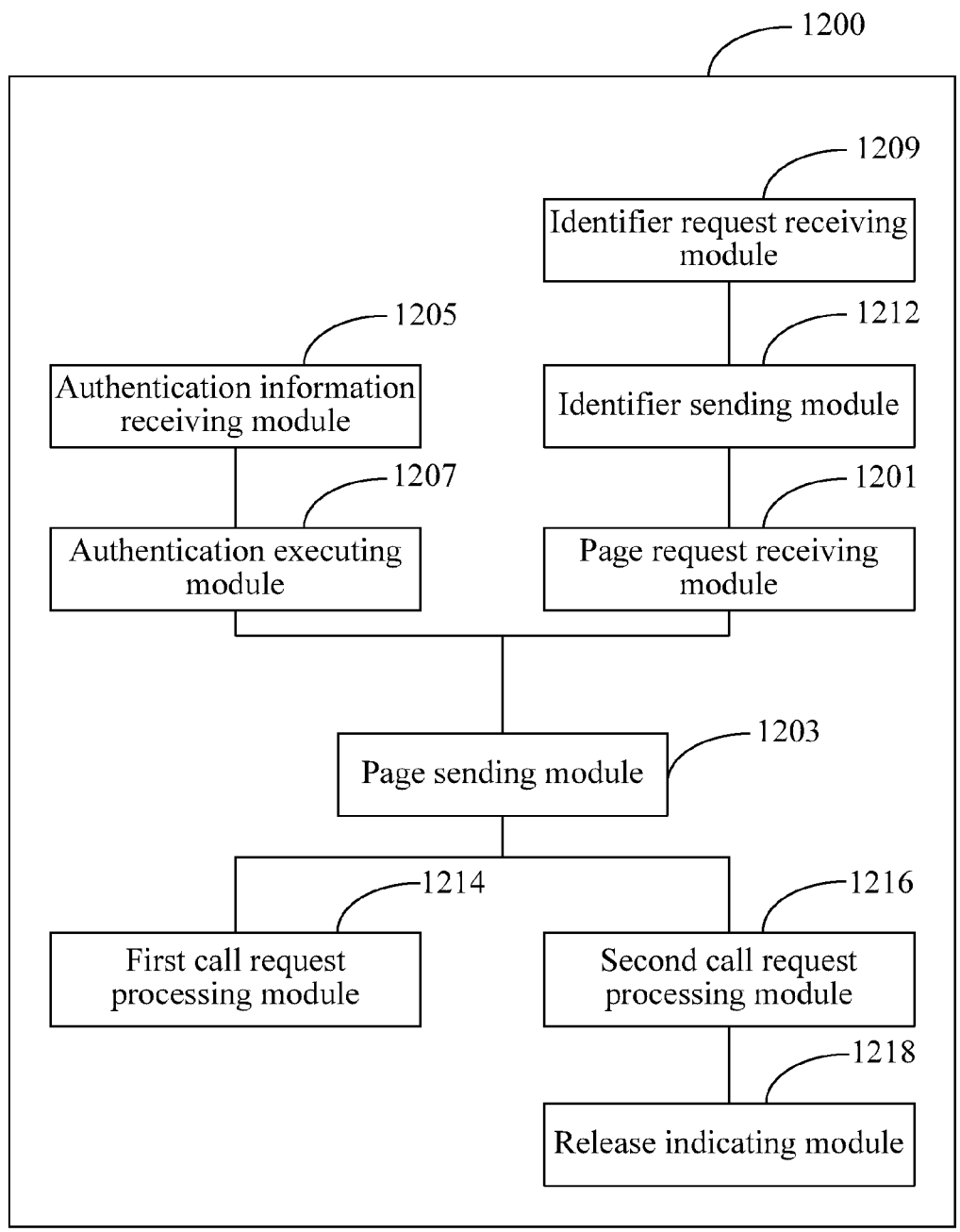
FIG. 12 is a schematic structural diagram of another WebRTC call transferring apparatus according to an embodiment of the present invention.

FIG. 12 is a schematic structural diagram of another WebRTC call transferring apparatus according to an embodiment of the present invention, where the WebRTC call transferring apparatus may be a WebRTC server. As shown in FIG. 12, the WebRTC call transferring apparatus 1200 includes a page request receiving module 1201 and a page sending module 1203.

The page request receiving module 1201 is configured to receive a first request message used for requesting page information corresponding to a to-be-transferred call and sent by a destination terminal according to a first identifier, where the first identifier is used for identifying the to-be-transferred call, and the to-be-transferred call is a WebRTC call having been established between a source terminal and a remote terminal.

The page sending module 1203 is configured to send, according to the first request message received by the page request receiving module 1201, the page information corresponding to the to-be-transferred call to the destination terminal, so that the destination terminal establishes, according to identification information of the remote terminal in the page information, a call connection used for bearing the to-be-transferred call with the remote terminal, so as to implement transferring of the to-be-transferred call from between the source terminal and the remote terminal to between the destination terminal and the remote terminal.

On the basis of the foregoing, in another implementation manner, the WebRTC call transferring apparatus 1200 may further include an authentication information receiving module 1205 and an authentication executing module 1207.

The authentication information receiving module 1205 is configured to, before the page sending module 1203 sends the page information corresponding to the to-be-transferred call to the destination terminal, receive authentication information of a first token sent by the destination terminal, where the first token is a token allocated by a browser server for the destination terminal and used for identifying the destination terminal.

The authentication executing module 1207 is configured to perform, according to a second token sent by the source terminal, authentication on the authentication information of the first token received by the authentication information receiving module 1205, where the second token is acquired by the source terminal from the browser server, and is a token allocated by the browser server for the destination terminal and used for identifying the destination terminal.

Further, the page sending module 1203 may be specifically configured to, if it is determined through the authentication performed by the authentication executing module 1207 on the authentication information of the first token that the first token is the same as the second token, send the page information corresponding to the to-be-transferred call to the destination terminal.

Further, the WebRTC call transferring apparatus 1200 may include an identifier request receiving module 1209 and an identifier sending module 1212.

The identifier request receiving module 1209 is configured to, before the page request receiving module 1201 receives the first request message used for requesting the page information corresponding to the to-be-transferred call and sent by the destination terminal according to the first identifier, receive a generation request for generating the first identifier, which is sent by the source terminal.

The identifier sending module 1212 is configured to send the first identifier generated according to the generation request received by the identifier request receiving module 1209 to the source terminal, so that the source terminal sends the first identifier to the browser server, and the browser server sends the first identifier to the destination terminal.

Further, the WebRTC call transferring apparatus 1200 may include a first call request processing module 1214.

The first call request processing module 1214 is configured to, after the page sending module 1203 sends the page information corresponding to the first identifier to the destination terminal, receive a call request message used for calling the remote terminal and sent by the destination terminal, send the call request message to the remote terminal, receive a response message returned by the remote terminal according to the call request message, and send the response message to the destination terminal, so that the destination terminal establishes the call connection with the remote terminal.

Further, the WebRTC call transferring apparatus 1200 may include a second call request processing module 1216 and a release indicating module 1218.

The second call request processing module 1216 includes a first receiving unit, a first changing unit, a first sending unit, a second receiving unit, a second changing unit, and a second sending unit.

The first receiving unit is configured to, after the page sending module sends the page information corresponding to the to-be-transferred call to the destination terminal, receive a call request message used for calling the remote terminal and sent by the destination terminal, where the call request message includes a first session identifier corresponding to the destination terminal.

The first changing unit is configured to change the first session identifier in the call request message received by the first receiving unit into a second session identifier corresponding to the source terminal.

The first sending unit is configured to send the call request message changed by the first changing unit to the remote terminal.

The second receiving unit is configured to receive a response message returned by the remote terminal according to the changed call request message, where the response message includes the second session identifier.

The second changing unit is configured to change the second session identifier in the response message into the first session identifier.

The second sending unit is configured to send the changed response message to the destination terminal, so that the destination terminal establishes the call connection with the remote terminal.

The release indicating module 1218 is configured to, after the destination terminal establishes the call connection with the remote terminal, send the source terminal a release indication message used for instructing the source terminal to release the to-be-transferred call.

The WebRTC call transferring apparatus provided in the embodiment of the present invention is equivalent to the WebRTC server in each foregoing embodiment, and as for working principles and working procedures of the modules and units in the embodiment of the present invention, refer to the foregoing method embodiments.

In the embodiment of the present invention, a page sending module of a WebRTC server sends, according to a request of a destination terminal, page information corresponding to a to-be-transferred call to the destination terminal, so that the destination terminal establishes, according to identification information of a remote terminal in the page information, a call connection with the remote terminal, so that a WebRTC call between a source terminal and the remote terminal may be transferred to between the destination terminal and the remote terminal without dropping the call, thereby implementing seamless transferring of a WebRTC call between terminals; moreover, authentication may be further performed on the destination terminal by using an authentication information receiving module and an authentication executing module of the WebRTC server, which increases security of the call transferring procedure, thereby ensuring that the call can be transferred to the designated destination terminal.

Based on the foregoing description of the implementation manners, it is clear to a person skilled in the art that the present invention may be implemented through hardware, or through firmware, or a combination thereof. When it is implemented through software, the foregoing function may be stored in a computer readable medium or may be transmitted as one or more instructions or code on the computer readable medium. The computer readable medium includes a computer storage medium and a communication medium, where the communication medium includes any medium facilitating transmission of a computer program from one place to another place. The storage medium may be any available medium that can be accessed by a computer. For example, the computer readable medium may include but is not limited to a random access memory (RAM), a read-only memory (ROM), an Electrically Erasable Programmable ROM (EEPROM), a compact disc ROM (CD-ROM), or another optical disc storage, magnetic disk storage medium or another magnetic storage device, or any other medium that is capable of carrying or storing expected program code having an instruction or data structure form and being accessed by the computer. Moreover, any connection may be the computer readable medium properly. For example, if the software is transmitted from a website, a server or another remote source by using a coaxial cable, an optical fiber cable, a twisted wire, a digital subscriber line (DSL), or a wireless technology such as infrared, radio and microwave, the coaxial cable, the optical fiber cable, the twisted wire, the DSL, or the wireless technology such as infrared, radio and microwave are included in the definition of the medium. A disk and a disc used in the present invention include a compact disc (CD), a laser disc, an optical disc, a digital versatile disc (DVD), a floppy disk, and a Blu-Ray disc, where the disk generally copies data magnetically, and the disc copies data optically by using laser. The combination may also be included in the protection scope of the computer readable medium.

In conclusion, those described in the foregoing are merely exemplary embodiments of the present invention, but not intended to limit the protection scope of the present invention. Any modification, equivalent replacement, or improvement made without departing from the spirit and principle of the present invention should fall within the protection scope of the present invention.

What is claimed is:

1. A web real-time communication (WebRTC) call transferring apparatus comprising:
   at least one memory comprising instructions; and
   at least one hardware processor coupled to the at least one memory, wherein the instructions cause the at least one hardware processor to be configured to:
      receive a first request message used for requesting page information corresponding to a to-be-transferred call and received from a destination terminal according to a first identifier, wherein the first identifier is used for identifying the to-be-transferred call, and wherein the to-be-transferred call is a WebRTC call having been established between a source terminal and a remote terminal;
      receive authentication information of a first token from the destination terminal, wherein the first token is a token allocated by a browser server for the destination terminal and used for identifying the destination terminal;
      send, according to the first request message, the page information corresponding to the to-be-transferred call to the destination terminal;
      receive from the destination terminal a call request message used for calling the remote terminal, wherein the call request message comprises a first session identifier corresponding to the destination terminal;
      change the first session identifier in the call request message into a second session identifier corresponding to the source terminal to generate a changed call request message;
      send the changed call request message to the remote terminal;
      receive a response message from the remote terminal according to the changed call request message, wherein the response message comprises the second session identifier;
      change the second session identifier in the response message into the first session identifier to generate a changed response message;
      send the changed response message to the destination terminal so that the destination terminal establishes a call connection with the remote terminal; and
      send the source terminal a release indication message used for instructing the source terminal to release the to-be-transferred call after the destination terminal establishes the call connection with the remote terminal.

2. The apparatus according to claim 1, wherein the instructions further cause the at least one hardware processor to be configured to:
   perform, according to a second token sent by the source terminal, authentication on the authentication information of the first token used for identifying the destination terminal; and
   send the page information corresponding to the to-be-transferred call to the destination terminal when it is determined through the authentication on the authentication information of the first token that the first token is the same as the second token.

3. The apparatus according to claim 1, wherein the instructions further cause the at least one hardware processor to be configured to:

receive a generation request for generating the first identifier, which is received from the source terminal, before receiving the first request message used for requesting the page information corresponding to the to-be-transferred call and received from the destination terminal according to the first identifier; and send the first identifier generated according to the generation request to the source terminal.

4. The apparatus according to claim 1, wherein a browser account logged into the source terminal is the same as a browser account logged into the destination terminal.

5. The apparatus according to claim 1, wherein a browser account logged into the source terminal is different from a browser account logged into the destination terminal, and wherein the browser server determines that a binding relationship exists between the source terminal and the destination terminal.

6. The apparatus according to claim 1, wherein the page information comprises at least one of a uniform resource locator (URL), user identifiers of two parties of the to-be-transferred call, a hypertext markup language (HTML) file, a JAVASCRIPT file, or a picture.

7. The apparatus according to claim 1, wherein the instructions further cause the at least one hardware processor to be configured to receive a second token from the source terminal before sending the page information corresponding to the to-be-transferred call to the destination terminal, wherein the first token is allocated by a browser server for the destination terminal and used for identifying the destination terminal.

8. The apparatus according to claim 7, wherein the instructions further cause the at least one hardware processor to be configured to:

compare the first token and the second token; and send, according to the first request message, the page information corresponding to the to-be-transferred call to the destination terminal when the first token and the second token are the same, wherein the destination terminal establishes, according to identification information of the remote terminal in the page information, a call connection used for bearing the to-be-transferred call with the remote terminal so as to implement transferring of the to-be-transferred call from between the source terminal and the remote terminal to between the destination terminal and the remote terminal.

9. The apparatus according to claim 8, wherein the browser server generates the first token and the second token.

10. A web real-time communication (WebRTC) call transferring method comprising:

receiving a first request message used for requesting page information corresponding to a to-be-transferred call and received from a destination terminal according to a first identifier, wherein the first identifier is used for identifying the to-be-transferred call, and wherein the to-be-transferred call is a WebRTC call having been established between a source terminal and a remote terminal;

receiving authentication information of a first token from the destination terminal, wherein the first token is a token allocated by a browser server for the destination terminal and used for identifying the destination terminal;

sending, according to the first request message, the page information corresponding to the to-be-transferred call to the destination terminal;

receiving from the destination terminal a call request message used for calling the remote terminal, wherein the call request message comprises a first session identifier corresponding to the destination terminal;

changing the first session identifier in the call request message into a second session identifier corresponding to the source terminal to generate a changed call request message;

sending the changed call request message to the remote terminal;

receiving a response message from the remote terminal according to the changed call request message, wherein the response message comprises the second session identifier;

changing the second session identifier in the response message into the first session identifier to generate a changed response message;

sending the changed response message to the destination terminal so that the destination terminal establishes a call connection with the remote terminal; and sending the source terminal a release indication message used for instructing the source terminal to release the to-be-transferred call after the destination terminal establishes the call connection with the remote terminal.

11. The method according to claim 10, further comprising:

performing, according to a second token sent by the source terminal, authentication on the authentication information of the first token used for identifying the destination terminal; and sending the page information corresponding to the to-be-transferred call to the destination terminal when it is determined through the authentication on the authentication information of the first token that the first token is the same as the second token.

12. The method according to claim 10, further comprising:

receiving a generation request for generating the first identifier, which is received from the source terminal, before receiving the first request message used for requesting the page information corresponding to the to-be-transferred call and received from the destination terminal according to the first identifier; and sending the first identifier generated according to the generation request to the source terminal.

13. The method according to claim 10, wherein a browser account logged into the source terminal is the same as a browser account logged into the destination terminal.

14. The method according to claim 10, wherein a browser account logged into the source terminal is different from a browser account logged into the destination terminal, and wherein the browser server determines that a binding relationship exists between the source terminal and the destination terminal.

15. The method according to claim 10, wherein the page information comprises at least one of a uniform resource locator (URL), user identifiers of two parties of the to-be-transferred call, a hypertext markup language (HTML) file, a JAVASCRIPT file, or a picture.

16. The method according to claim 10, further comprising receiving a second token from the source terminal before sending the page information corresponding to the to-be-transferred call to the destination terminal, wherein the first token is allocated by a browser server for the destination terminal and used for identifying the destination terminal.

17. The method according to claim 16, further comprising:
- comparing the first token and the second token; and
- sending, according to the first request message, the page information corresponding to the to-be-transferred call to the destination terminal when the first token and the second token are the same, wherein the destination terminal establishes, according to identification information of the remote terminal in the page information, a call connection used for bearing the to-be-transferred call with the remote terminal so as to implement transferring of the to-be-transferred call from between the source terminal and the remote terminal to between the destination terminal and the remote terminal.

18. The method according to claim 17, wherein the browser server generates the first token and the second token.

\* \* \* \* \*